United States Patent
Anastassov

(10) Patent No.: US 10,803,096 B2
(45) Date of Patent: Oct. 13, 2020

(54) PARALLELIZED CLUSTERING OF GEOSPATIAL DATA

(71) Applicant: HERE Global B.V., Eindhoven (NL)

(72) Inventor: Anton Anastassov, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 282 days.

(21) Appl. No.: 15/718,951

(22) Filed: Sep. 28, 2017

(65) Prior Publication Data
US 2019/0095514 A1  Mar. 28, 2019

(51) Int. Cl.
| | | |
|---|---|---|
| G06F 17/30 | (2006.01) | |
| G06F 16/28 | (2019.01) | |
| G06F 16/29 | (2019.01) | |
| G06F 16/23 | (2019.01) | |
| G06F 16/35 | (2019.01) | |

(52) U.S. Cl.
CPC ........ *G06F 16/287* (2019.01); *G06F 16/2379* (2019.01); *G06F 16/29* (2019.01); *G06F 16/355* (2019.01)

(58) Field of Classification Search
CPC .......... G01C 21/00; G06F 16/29; G09B 29/00
See application file for complete search history.

(56) References Cited

U.S. PATENT DOCUMENTS

| | | |
|---|---|---|
| 8,521,782 B2 | 8/2013 | Gong et al. |
| 9,507,808 B2 | 11/2016 | Fischer |
| 2012/0116678 A1* | 5/2012 | Witmer ............... G01C 21/32 702/5 |
| 2014/0278055 A1* | 9/2014 | Wang .................. G01C 21/32 701/409 |
| 2015/0170514 A1* | 6/2015 | Stenneth ............. G08G 1/0125 701/117 |
| 2016/0179874 A1 | 6/2016 | Lynch |
| 2018/0188059 A1* | 7/2018 | Wheeler ............... B60W 40/04 |

FOREIGN PATENT DOCUMENTS

CN          107038248 A     8/2017

OTHER PUBLICATIONS

He et al., "Mr-dbscan: an Efficient Parallel Density-based Clustering Algorithm Using Mapreduce", https://pdfs.semanticscholar.org/4244/628f1005785a21a6fdb3f4b26d1f06cf1871.pdf, pp. 473-480, 2011.

(Continued)

*Primary Examiner* — Usmaan Saeed
*Assistant Examiner* — William P Bartlett
(74) *Attorney, Agent, or Firm* — Lempia Summerfield Katz LLC

(57) ABSTRACT

System and methods are provided for parallel geospatial clustering. A link tile association is determined between one or more links and a tile of a plurality of tiles. Map matched geospatial data is acquired for the tile based on the link tile association. A family of links is generated from the one or more links. A cluster of the map matched geospatial data is identified that is at least partially associated with the family of links. The cluster is determined to be centered on a link of the family of links that originates in the tile. The cluster is assigned to the tile. The cluster is reported for aggregation with other clusters from other parallelized processes.

17 Claims, 16 Drawing Sheets

(56) References Cited

OTHER PUBLICATIONS

Sakai et al.:, "Parallel Processing for Density-based Spatial Clustering Algorithm Using Complex Grid Partitioning and Its Performance Evaluation", http://worldcomp-proceedings.com/proc/p2016/PDP7562.pdf, pp. 337-343, 2016.
Yu et al., "Cludoop: an Efficient Distributed Density-based Clustering for Big Data Using Hadoop", http://journals.sagepub.com/doi/pdf/10.1155/2015/579391, pp. 1-13, 2015.
Demšar, Urška. Data mining of geospatial data: combining visual and automatic methods. Diss. KTH, Apr. 2006. (pp. 1-101).
PCT Written Opinion of the International Examination Report dated Nov. 30, 2018 for corresponding PCT/US2018/049932.

\* cited by examiner

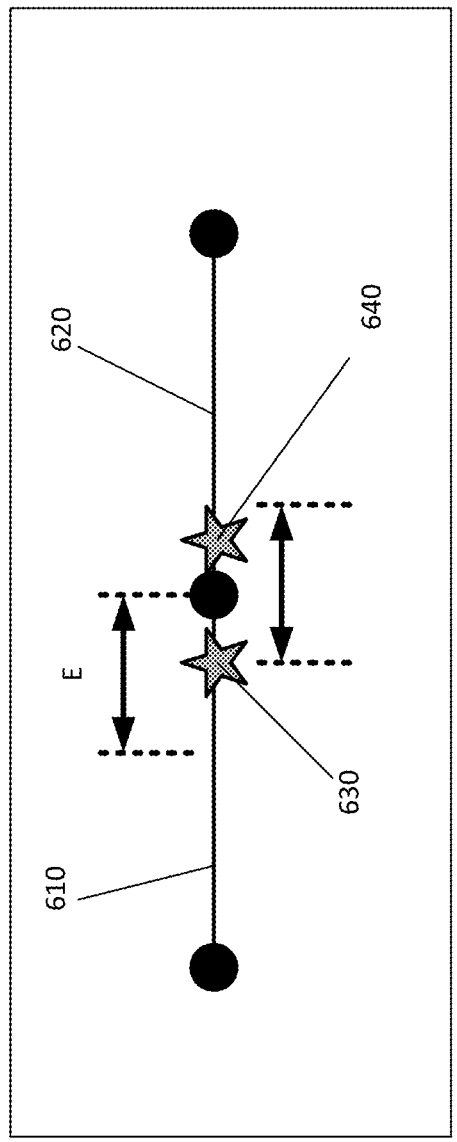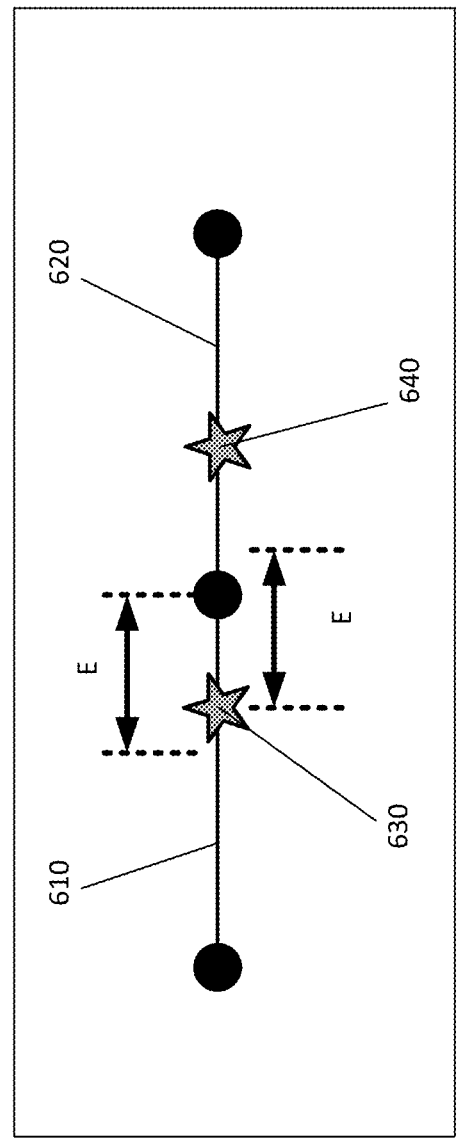

PARALLELIZED CLUSTERING OF GEOSPATIAL DATA

FIELD

The following disclosure relates to navigation or mapping services.

BACKGROUND

For mapping applications, large amounts of data may be consumed in order to create detailed and accurate maps. Geospatial data is collected by numerous devices as the devices traverse the roadway. Transforming the geospatial data into useful data requires processing the geospatial data. Clustering algorithms may be run on geospatial data based on similarity criteria and location to identify features on the roadway. Many of the clustering algorithms suitable for performing geospatial clustering require that all data is available for the algorithm at once.

With the large amount of data, a single processing node may not be able to process the data within an acceptable time frame. Parallel processing nodes may be used to speed up the clustering.

SUMMARY

In an embodiment, a method is provided for partitioning geospatial data for parallel processing. A link tile association is determined between one or more links and a tile of a plurality of tiles. Map matched geo spatial data is acquired for the tile based on the link tile association. A family of links is generated from the one or more links. A cluster of the map matched geospatial data is identified that is at least partially associated with the family of links. The cluster is determined to be centered on a link of the family of links that originates in the tile. The cluster is assigned to the tile. The cluster is reported for aggregation with other clusters from other parallelized processes.

In an embodiment, a method is provided for partitioning map matched geospatial data for parallel processing. One or more first links are assigned to a tile, where the one or more first links are entirely within the tile. One or more families of links are generated comprising one or more second links. The families of links originate in the tile. The one or more second links are assigned to the tile. One or more geospatial data clusters of map matched geospatial data are identified that are centered on the one or more first links or centered on the one or more second links. The geospatial data clusters are reported for aggregation with other parallel processed geospatial data.

In an embodiment, a system is provided for partitioning map matched geospatial data for parallel processing. The system includes a geographic database, a mapping system, and a parallel processor of a plurality of parallel processers. The geographic database is configured to store one or more features and locational data. The mapping system is configured to determine a link tile association between one or more links and a tile of a plurality of tiles; acquire map matched geo spatial data; generate a family of links from the one or more links; and update the geographic database with cluster data from a plurality of parallel processors. The parallel processor of the plurality of parallel processors is configured to identify a cluster of the map matched geospatial data at least partially associated with the family of links; determine that the cluster is centered on a link of the family of links originating in the tile; and report cluster data for the cluster to the mapping system

BRIEF DESCRIPTION OF THE DRAWINGS

Exemplary embodiments of the present invention are described herein with reference to the following figures.

FIGS. 9A and 9B depict an example of generating a family of links.

DETAILED DESCRIPTION

Embodiments described herein provide systems and methods for parallel geospatial clustering. The method performs an efficient partitioning of geospatial data before parallel clustering. The partitioning prevents errors and inaccuracies from the results of different processors.

Clustering is the process of grouping data with similar data. For geospatial data, clustering is grouping the geospatial data based on location. Examples of clustering algorithm include using k-means or trees to identify the cluster. Another often used algorithm is DBSCAN (density-based spatial clustering of applications with noise). DBSCAN infers the number of clusters based on the data and may be able to discovers clusters of arbitrary shape. DBSCAN and other algorithms may be run on any size dataset, however, with more data, the processing resources and time may be prohibitive. In order to efficiently process large data sets, a parallel process may be used to run algorithms such as DBSCAN simultaneously on portions of the data.

Parallel processing involves multiple processors handling similar tasks for different sets of data. The input data is split into different partitions for processing. For clustering algorithms, each processor may perform a clustering algorithm on a partition of data. The output of the clustering algorithm is combined to generate the feature data for the entirety of the dataset. One challenge for parallel processing is partitioning the data so that the process is both efficient (time and resource wise) and accurate (duplication errors are minimized). Geospatial data may require partitions of data where the data is not uniformly distributed. Attempts to divide the dataset may result in border cases, e.g. where one or more data points may be cut off from a rest of a cluster by the division. In order to not double count observations, the data must be partitioned so that in the output data, each cluster is only identified once by the parallel processing system. In other words, for a parallel data processing model for geospatial data, a partitioning model needs to be used that produces identical results to the results of a single processor model.

Methods for partitioning include pre-processing the geospatial data to identify a tile or partition for the geospatial data. The pre-processing step uses a partitioning scheme to split the data into groups. The method divides an entire geospatial dataset using grid division of the space index, and each computer performs clustering for the divided geospatial data. Each processor performs the same processing on different partitions.

Figure 1:
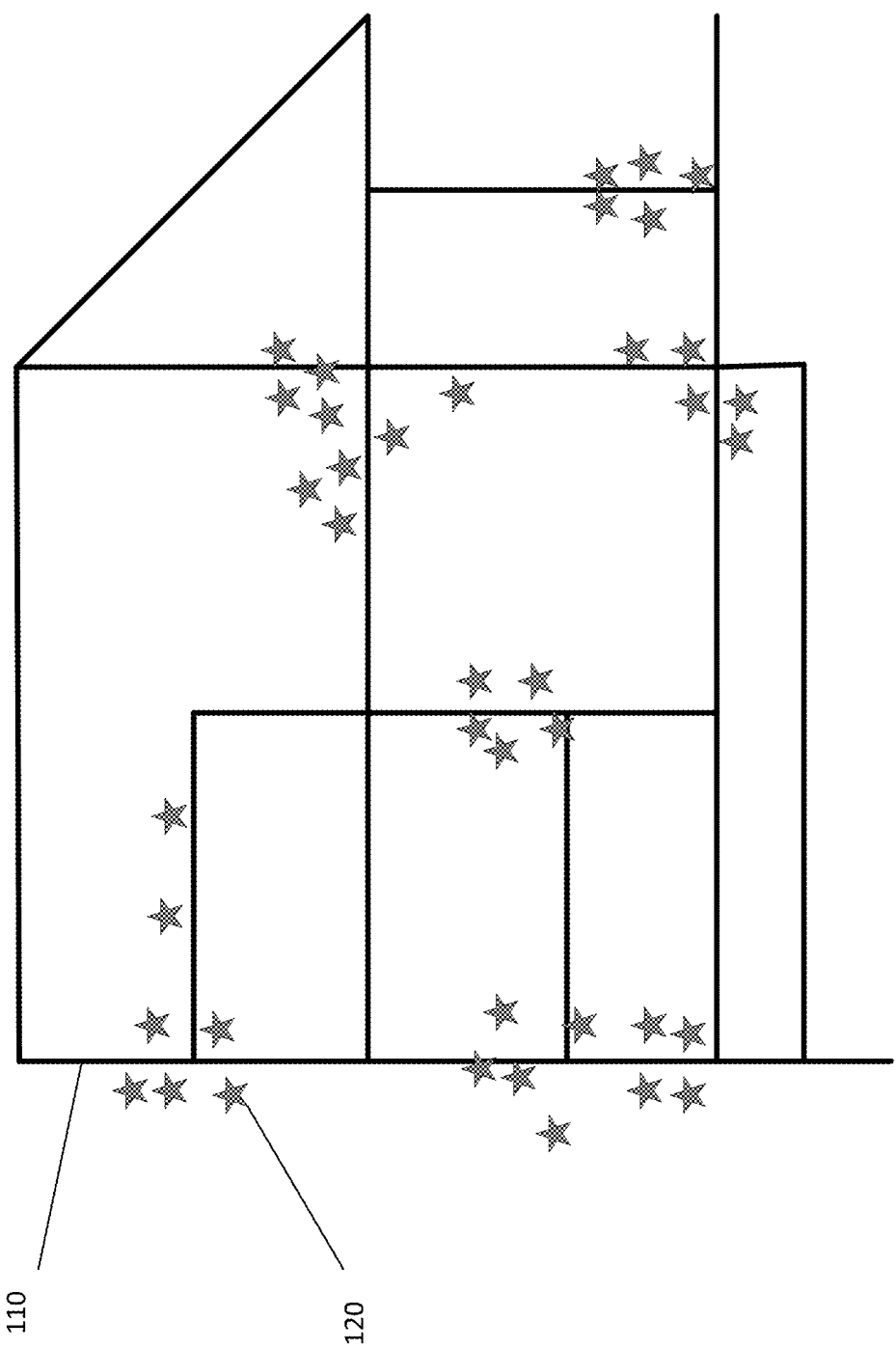
FIG. 1 depicts an example dataset of geospatial data.
Figure 2:
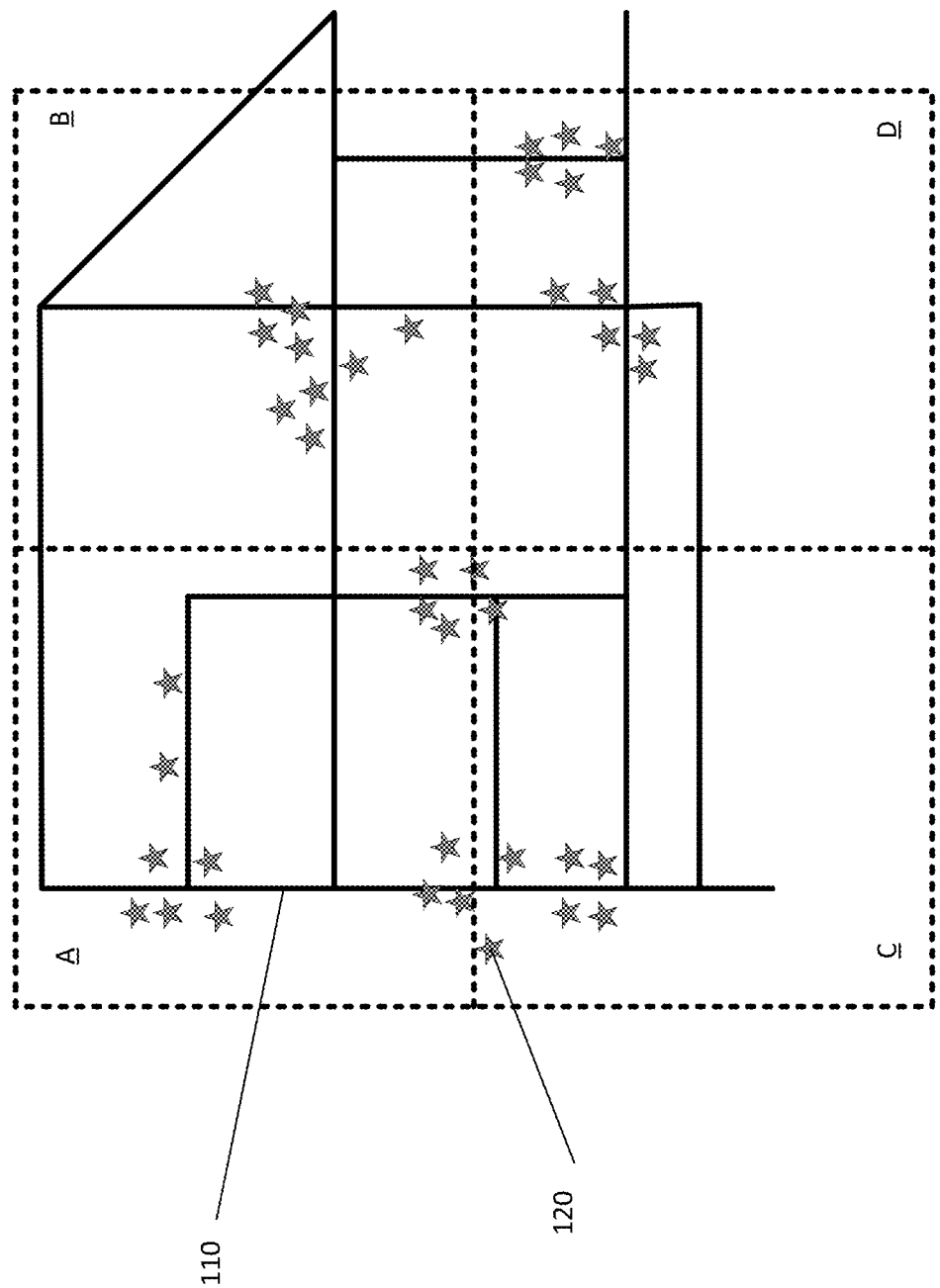
FIG. 2 depicts an example tile based partition of the geospatial data of FIG. 1.

FIGS. 1 and 2 depict partitions of geospatial data using tiles. FIG. 1 depicts a roadway network 110 with multiple observational data points 120. Each of the observational data points 120 may include coordinate data (e.g. latitude and longitude) that allows the data points to be mapped to the underlying roadway network 110. As depicted the data points 120 are spread out over the roadway network 110, but may appear to form clusters. A clustering algorithm may be run on the entire dataset to identify the clusters. A more efficient method may be to run multiple versions of the clustering algorithm on different portions. A parallelized process may save time. In order to run parallelized process, the data must be partitioned for each processing unit.

FIG. 2 depicts a grid laid out over the roadway network 110 of FIG. 1. FIG. 2 includes four square tiles A, B, C, and D created by the grid. Each of the tiles includes some observational data points 120. Under the assumption that FIGS. 1 and 2 include six clusters, the tiles B and D may be processed without any duplication. There is no overlap in the data points 120 with other tiles. However, for tiles A and C, two clusters are split between the two tiles. If the observational data is cut off exactly at the border, clustering algorithms run on data points in A and C may report duplicative clusters (with potentially the wrong center point or actual location). Partitioning processes may be used to correct the duplication and accuracy errors.

In one partitioning method, partitioning is done by calculating the density of geospatial data near the boundary of the grids. Each gird contains a replication of geospatial data beyond the borders of the grid. The replication allows a calculation of the density of geospatial data near the boundary of the grids. In complex grid partitioning, a complex grid is composed of highly dense adjacent grids. Composing a complex grid reduces the number of grids; therefore, the number of replications decreases compared with simple grid partitioning. An alternative method pre-clusters the data to partition the geospatial data. Cell partition optimization and c-cluster are used to find clusters. Classification of the points is completed using the relationships of connected cells around points instead of expensive completed neighbor query. In another method, the map is partitioned into a number of partial clustered graphs. Each partially clustered partition is processed on a respective machine in a networked system so that multiple partitions of the original graph are processed in parallel. The sub-clusters comprising each of the partial clustered graphs are merged using message-based mechanism. Each of these prior partitioning method may be complex and inefficient. Pre-clustering or complex sub partitioning may require additional time and resources. The methods are further difficult to alter for different types of observational data.

Embodiments provide methods and systems for partitioning geospatial data for parallel processing. Depending on the type of input geospatial data, the geospatial data may be partitioned using a two-dimensional (x,y coordinate based) or one dimensional (x, link identifier) process. For map matched geospatial data, a one-dimensional method may be used. Map matched geospatial data includes a link identifier of a matching link, a position of a map matched point on the link, and a direction of travel that are used as parameters of each observation (data point). A directional link is associated with a map tile if an origin of the link is in the tile. If a link crosses a tile boundary, two directional links from different tiles are considered. Information about link connectivity (i.e. entry and exit links associated with a link) is used to perform clustering across two or more links. Data associated with an extended collection of links associated with a tile is collected and defined as a data partition.

The one-dimensional process for map matched geospatial data identifies families of links (i.e. ordered sets of directional links that potentially contain clusters that can cross tile boundaries) by using a distance parameter. If a link has a first data point within the distance parameter of its end and a connected exit link has a second data point within the distance parameter form the first data point, the exit link is added to a family with the first link. If the exit link has an extension, the extension is also added to the family. The families of links are clustered using a clustering algorithm (e.g. DBSCAN) for each observation type. For each partition, clusters with centers on links originating from the tile are accepted and reported to the system for aggregation with other accepted clusters from other tiles. The aggregated data may be used to update a database or be transmitted to a navigation device.

For two-dimensional geospatial data, raw geospatial positions (e.g. without map matching) is partitioned based on tile association level. A distance parameter is used to define tile extension margins for partitioning of the data. The data is partitioned based on association with a tile extended by a margin distance. A clustering algorithm (e.g. DBSCAN) is run on each partition independently. Clusters with centers within a proper tile boundary are accepted and reported to the system for aggregation with other accepted clusters from other tiles. Clusters with centers in extended tile region are rejected (rejected clusters are reconstructed and accepted in a neighboring partition).

The disclosed embodiments may be implemented to computationally facilitate parallel processing of geospatial data and consequently improving and optimizing navigation services. Feature discovery for navigation services may be facilitated. For example, features such as speed bumps, traffic signs, points of interest, accident location, event location, etc. may be more efficiently identified from multiple (potentially imprecise) reports/detections that are clustered to determine the event/feature position. The disclosed embodiments lead to an improvement in the computational system, e.g. in the way that geospatial data is partitioned in order to avoid duplication and as such reduce computation resources and time needed. The increased efficiency and usage of resources may lead to less downtime, quicker implementation time, fewer errors, and as such, more efficient use of geospatial data. The quicker implementation time and fewer error may lead to more accurate up to date map data for navigation services.

Figure 3:
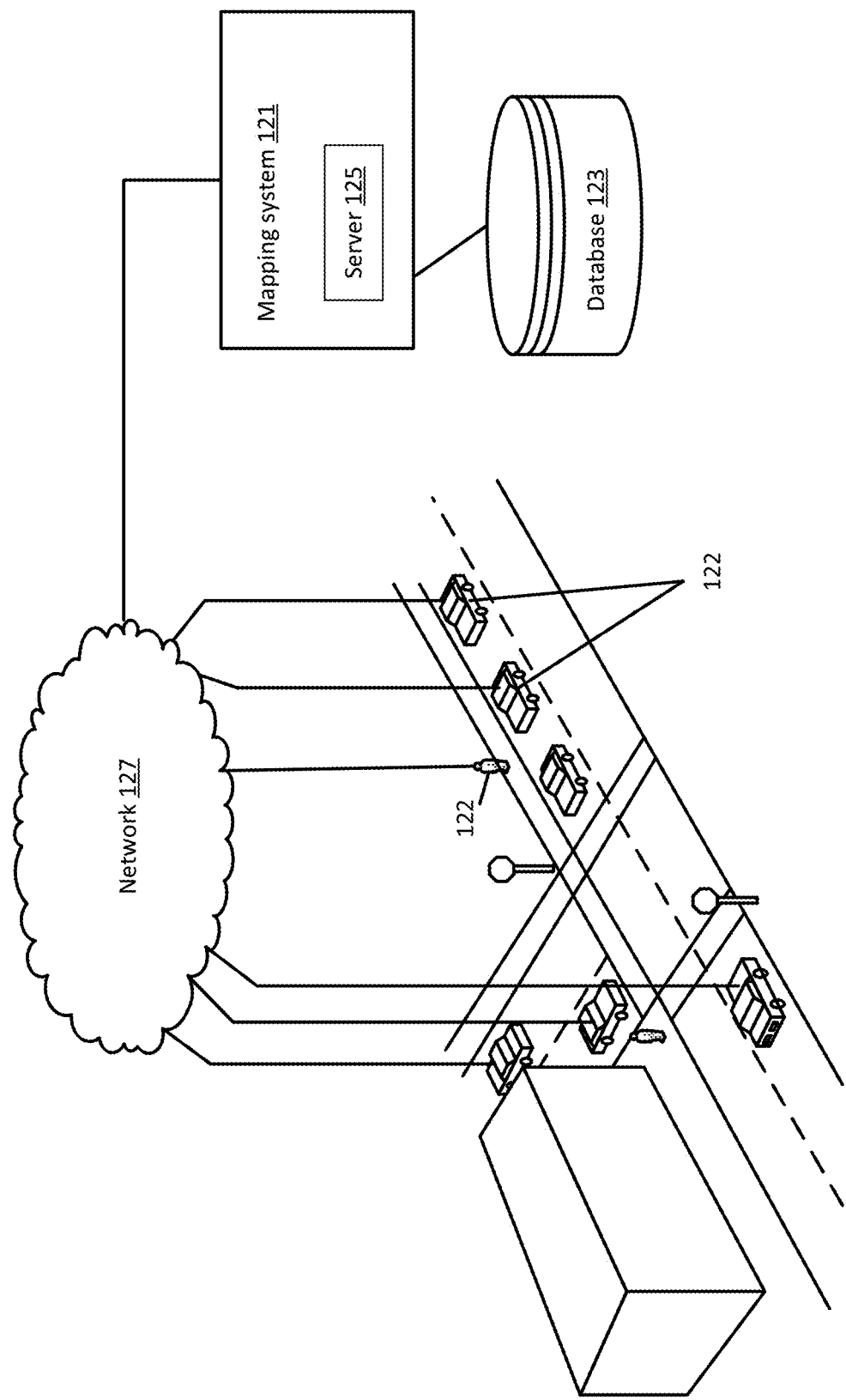
FIG. 3 depicts a system for partitioning geospatial data for parallelized clustering according to an embodiment.

FIG. 3 depicts a system for partitioning geospatial data for parallelized clustering. The system includes one or more devices 122, a network 127, and a mapping system 121. The mapping system 121 may include or may be connected to a database 123 (also referred to as a geographic database or map database). The mapping system 121 may include one or more servers 125. The servers 125 may each represent a processing node in a parallel processing system. Each processing node may be co-located with the other processing nodes or may be remotely located. Additional, different, or fewer components may be included.

The system includes one or more devices 122. The one or more devices may include probe devices, probe sensors, or other devices 122 such as personal navigation devices 122 or connected vehicles. The mapping system 121 may communicate with the devices 122 through the network 127. The mapping system 121 may also receive data from one or more systems or services that may be used to identify the location of a vehicle or roadway conditions. The device 122 may be a navigation system built into the vehicle and configured to monitor the vehicle. The devices 122 may also be integrated in or with a vehicle. The devices 122 may include mobile phones running specialized applications that collect location data as the devices 122 are carried by persons or things traveling the roadway system. The devices 122 may be configured to collect and transmit data including the location of a vehicle and other geospatial data. The devices 122 may be configured to monitor conditions in the vicinity of the vehicle. The devices 122 may be configured to provide guidance for a user or vehicle.

The device 122 may be configured to acquire and transmit geospatial data on the roadway network to the location mapping system 121. As depicted in FIG. 3, the device 122 may be configured to identify a roadway feature (e.g. signage) and the location of the roadway feature (approximation using positional circuitry or image processing). The identification of the roadway feature and location may be referred to as observational data points. Observational data points may include positional coordinates such as latitude and longitude derived from a positioning system such as GPS. Observational data points may include a description of the feature (e.g. signage, point of interest, or other roadway feature). In an embodiment, the observational data points are map matched to a link identifier by the device. Alternatively, the mapping system 121 may map match the observational data point. Any map matching algorithm may be used.

The mapping system 121 and devices 122 are connected to the network 127. The devices 122 may receive or transmit data through the network 127. The mapping system 121 may receive or transmit data through the network 127. The mapping system 121 may also transmit paths, routes, or feature data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, DSRC (otherwise known as WAVE, ITS-G5, or 802.11p and future generations thereof), a 5G wireless network, or wireless short-range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The mapping system 121 may include multiple servers 125, workstations, databases, and other machines connected together and maintained by a map developer. The mapping system 121 may be configured to receive and process observational data from devices in the roadway. The mapping system 121 may be configured to determine features and locations of the features from the observational data. The mapping system 121 may be configured update a geographic database 123 with the features and locations. The mapping system 121 may be configured to provide feature data and location data to devices. The mapping system 121 may also be configured to generate routes or paths between two points (nodes) on a stored map. The mapping system 121 may be configured to provide up to date information and maps to external geographic databases 123 or mapping applications. The mapping system 121 may be configured to encode or decode map or geographic data. Feature data may be stored by the mapping system 121 using geographic coordinates such as latitude and longitude. The mapping system 121 may acquire data relating to the roadway though one or more devices 122.

The mapping system 121 may include one or more processors connected in parallel. The mapping system 121 or one or more processors may be implemented in a cloud based computing system or a distributed cloud computing service. The data may be distributed and not directly accessible from other processors or nodes in the network. The one or more processors may be configured to process observational datasets in order to identify features and locations of the features in the roadway. The one or more processors may be configured as parallel processors. Each processor of the one or more processor may perform a similar task in parallel with the other processors. The mapping system 121 may update a geographic database 123 with the output of the parallel processors.

The mapping system 121 may include one or more server(s) 125. A server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the links, segments, paths, or routes using historical, recent, or real time collected data.

The mapping system 121 includes the geographic database 123. In order to provide navigation related features and functions to the end user, the mapping system 121 accesses the geographic database 123. The mapping system 121 may use data from the geographic database 123 to predict the location of a feature. For example, the mapping system 121 may identify features in a roadway described by data in the geographic database 123. The mapping system 121 may identify features from observational data received from devices. The mapping system 121 may process an observational dataset in order to provide features and locations for the geographic database 123. The mapping system 121 may update or annotate the geographic database 123 with the features.

Figure 4:
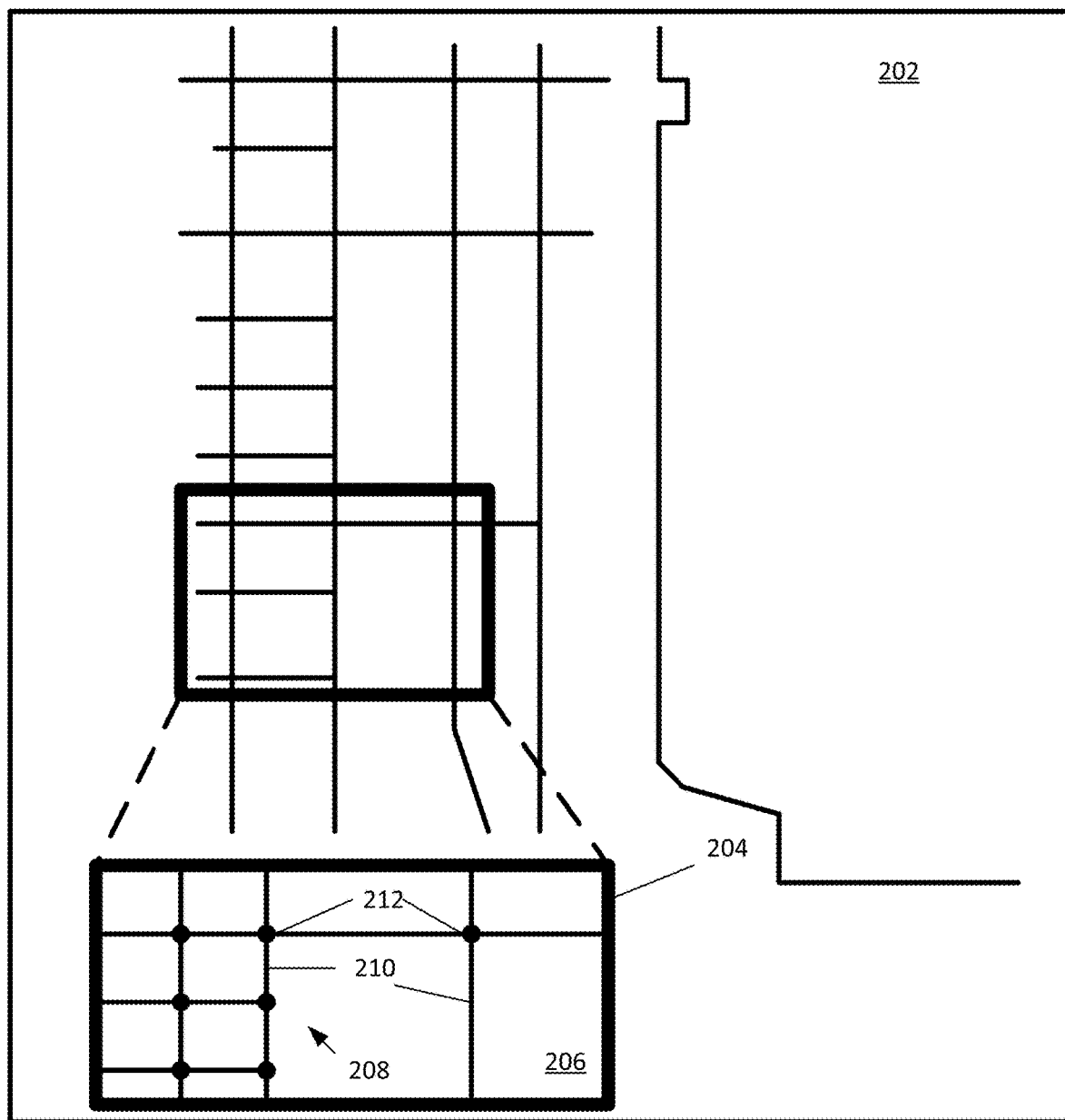
FIG. 4 depicts an example map of a geographic region.

The geographic database 123 includes information about one or more geographic regions. FIG. 4 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 4 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 5:
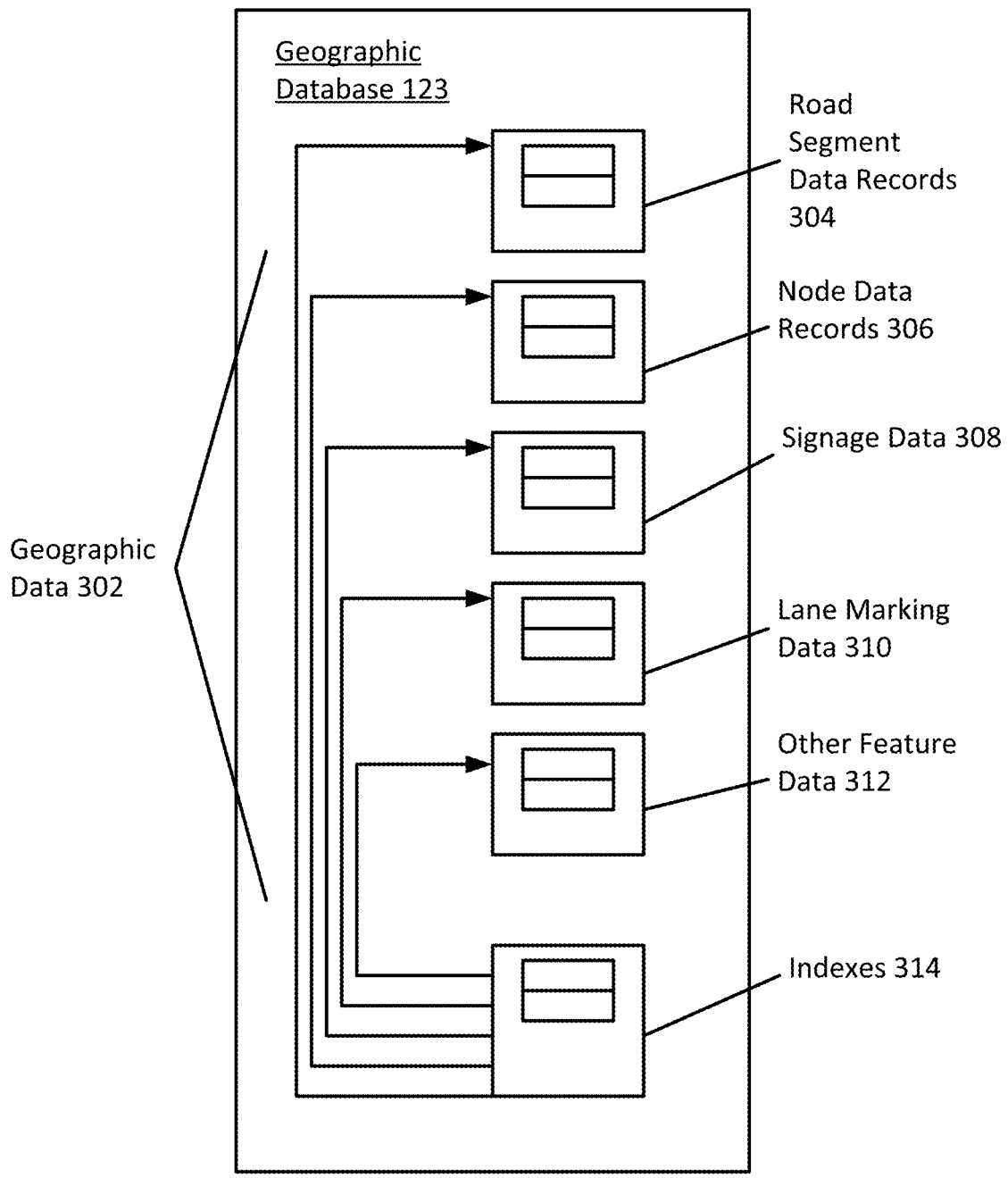
FIG. 5 depicts an example geographic database.

As depicted in FIG. 5, in one embodiment, the geographic database 123 contains geographic data 302 that represents some of the geographic features in the geographic region 202 depicted in FIG. 3. The data 302 contained in the geographic database 123 may include data that represent the road network 208. In FIG. 5, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include signage records 308 that identify the location of signage on the roadway. For example, the signage data 308 may include data for one or more signs (e.g. stop signs, yield signs, caution signs, etc.) that exist on the roadway network. The feature data may include lane features 310 that indicate lane marking on the roadway. The other kinds of feature data 312 may include point of interest data or other roadway features. The point of interest data may include point of interest records comprising a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The feature data may also include painted signs on the road, traffic signal, physical and painted features like dividers, lane divider markings, road edges, center of intersection, stop bars, overpasses, overhead bridges etc. The feature data may be identified from observational data received by the devices 122. Observational data may be acquired by the mapping system 121, partitioned and clustered to identify accurate locational data for the features on a roadway.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate feature data such as the signage records 308 with a road segment in the segment data records 304 or a geographic coordinate. The indexes 314 may also store repeating geometry patterns or relationships for links or nodes that represent repeating geometry patterns.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway.

The geographic data may be observational data collected, for example, by one or more devices. Different sets of observational data may be received from different sources or at different times. The observational data may be aggregated into sets based on the source, region, or time period. For example, a particular type of device (version 1.1) may provide data for a particular region (e.g. the State of Virginia) for a particular time period (e.g. January 1-January $15^{th}$). If the observational data included 100% accurate location data, the observational data could be directly input into the geographic database 123. However, due to locational or positional errors, observation data for the same feature on a roadway may be collected with different locations. For example, due to GPS errors a stop sign may be observed by two different devices as existing in slightly different locations. For advanced mapping applications (for example, autonomous vehicles), the actual location of the stop sign needs to be identified (and also to discard any duplicative features). Observational data may be received over time and aggregated by the mapping system 121. Newly received observational data may be used to overwrite older feature data. New observational data may be combined with older observational data. Observational data may be used to validate existing data in the geographic database 123.

The geographic database 123 and the data stored within the geographic database 123 may be licensed or delivered on-demand. Other navigational services or traffic server providers may access the traffic data and the feature data stored in the geographic database 123. Data including feature data may be broadcast as a service.

In one embodiment, the geographic database 123 is presented according to a hierarchical or multi-level tile projection. More specifically, in one embodiment, the geographic database 123 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grids. Because of the numbering system, the exact position of any tile in any level of the map tile grid or projection may be uniquely determined from the tile ID.

In one embodiment, the mapping system 121 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid. In one embodiment, the quadkey is an example of the hash or encoding scheme of the respective geographical coordinates of a geographical data point that can be used to identify a tile in which the geographical data point is located.

Figure 6:
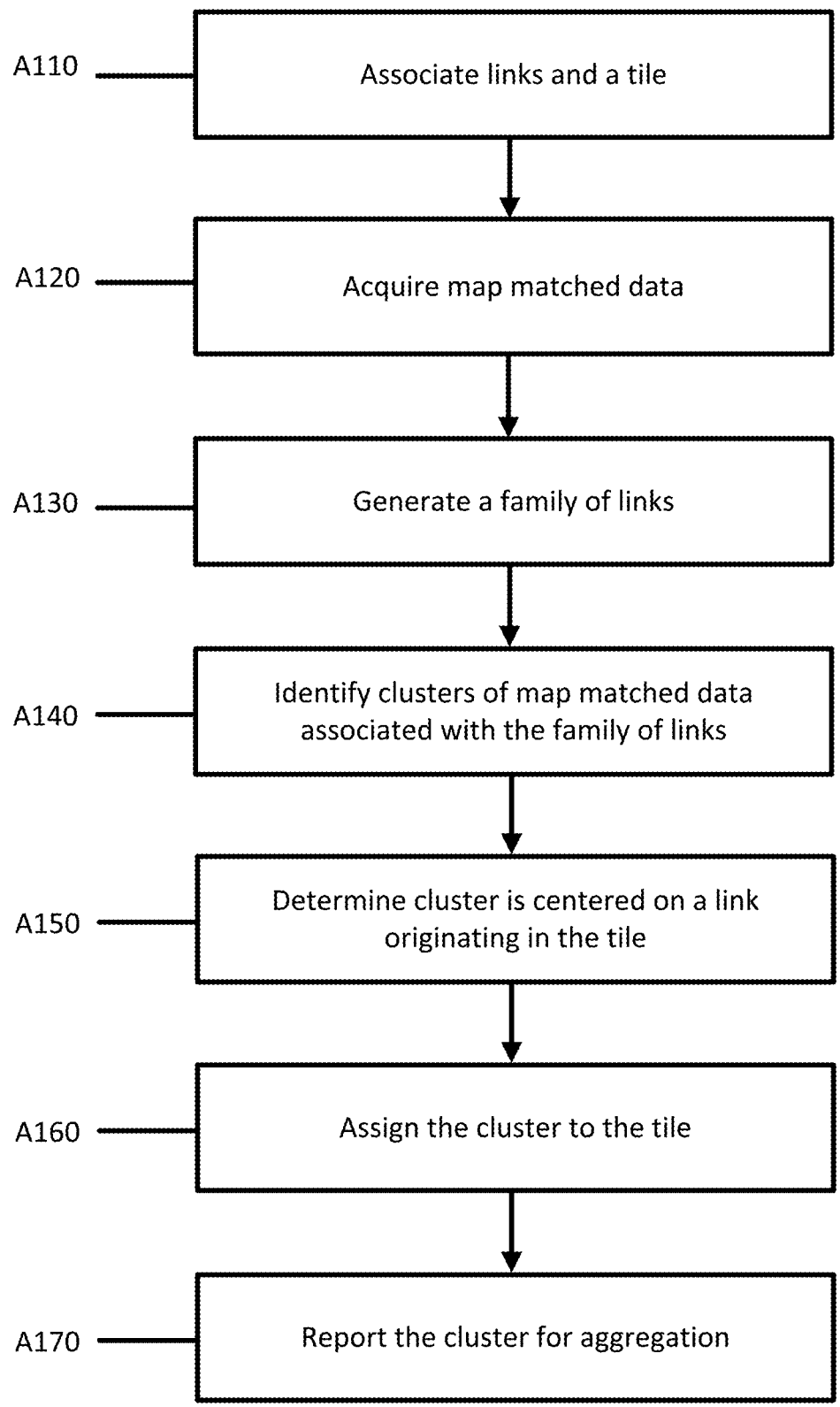
FIG. 6 depicts a workflow for partitioning geo spatial data for parallelized clustering according to an embodiment.

FIG. 6 illustrates an example flow chart for parallel geospatial clustering. As presented in the following sections, the acts may be performed using any combination of the components indicated in FIG. 3, FIG. 12, or FIG. 16. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A110, one or more links are associated with an extended tile of a plurality of tiles. A tile may be a portion of a geographic area. The tile may correspond to a standard zoom level of a digital map. Tiles may be shaped as a square, rectangular, or other polygonal shape. The size and therefore number of tiles for a geographic area may be selected automatically or by a user. A parameter may be available to a user to specify the tile level size based on a user's knowledge of the dataset. The tile level may be set automatically given some input information on the data to be processed.

The size and number of tiles may be selected automatically by the mapping system based on the type or amount of data in a dataset. The size and number of tiles may be selected based on an amount of resources available for processing of the dataset. For example, the number of tiles may be selected so that each tile is assigned to a processor (or virtual processor) in a parallel processing system. If there are fewer processing nodes, the size of the tiles may be selected so that there are fewer tiles. The size and number of tiles may be selected base on a desired time to finish. Larger tiles may require additional time to perform a clustering algorithm. Smaller tiles (and more processors) may require less time. A time sensitive dataset may include smaller tiles while another dataset that is not time sensitive may include larger tiles.

The type and volume of observational data may be used to select the number or shape of the tiles. For example, observational data that is packed tightly together in a region may use smaller tiles in order to assist in the clustering algorithm. Sparse data may use larger tiles due to a potential for the clustering algorithm to be less computationally expensive. Observational data for certain features may be more spread out than other features and may use larger tiles.

Links may be associated with the tile by identifying nodes of the links and determining if a node is located in the tiles or within a predefined distance (e.g. extended tile) of the tile border. In an embodiment, an origin node for the link is identified. Whether or not the origin node is within the tile or extended tile may determine if the link is associated with the tile. An origin node for a link may be identified based on attributes of the link including the direction of travel. For example, the origin node for a link may be the node from which traffic enters the link. The exit node may be the node from which traffic leaves the link.

An extended tile is a tile that has borders extended out by a distance (D). For efficient operation D should be selected to be a relatively small fraction of the tile size. For example, the larger D becomes, the more additional data points the clustering algorithm must compute. D may be selected (or automatically selected) based on the type of observational data and/or the clustering tendencies of the observational data. For example, for certain observational data, the data points are clustered tightly together. D may be selected as a function of the average, expected maximum distance from the center of the cluster to an outlying data point, or so that the two most distant points are separated by distance less than D. Certain dataset collected in a certain way (e.g. though image sensors, lidar, or radar) may have similar D's. Over time as similar datasets are processed, a more ideal D may be identified for each type and method of collection of a feature.

Figure 7:
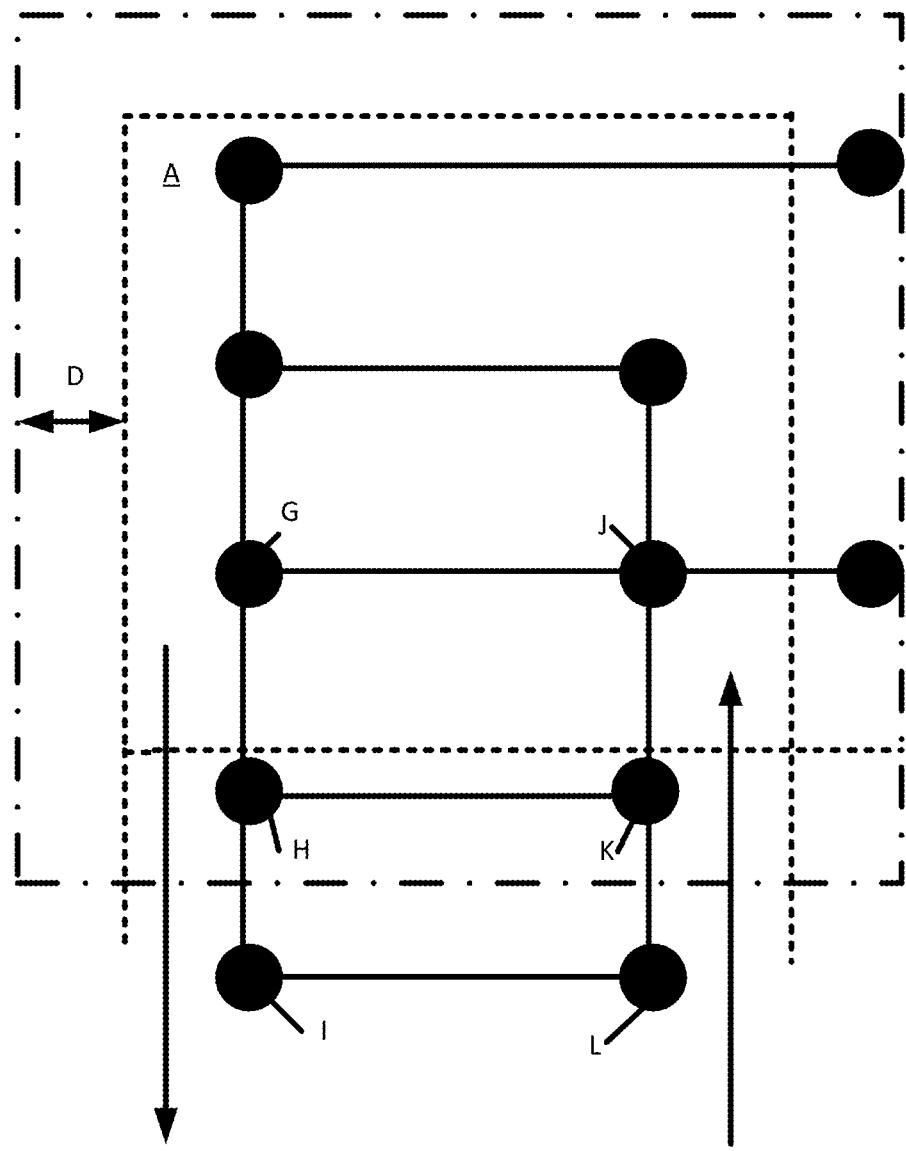
FIG. 7 depicts an example of links that are associated with an extended tile.

FIG. 7 depicts links that are associated with an extended tile. FIG. 7 includes nodes (e.g. G, H, I, J, K, L) and links (designated by the two nodes, e.g. link GH, link GJ, link HK, link HI, etc.) for the roadway network of FIG. 1 and Tile A of FIG. 2. Each link includes two nodes. Each node is connected to at least one link. In FIG. 7, for example, Link GJ is associated with the tile A because both Nodes G and J are located within the borders of A. For FIG. 7, links GH, HI, JK, and JL have direction components. links GH and GI are directed downwards, e.g. traffic flows from G to H to I. Links JK and KL are directed upwards, e.g. traffic flows for L to K to J. The directional aspect of the links may determine the origin of the links. For example, the origin node of HI is H as H is where the traffic enters from. The origin node for GH is G, the origin node for JK is K, the origin node for KL is L, and so on. When determining which links are associated with the tile A (and extended tile defined by the distance D from the tile boundaries), the system identified the origin nodes of the links. Accordingly link HI is associated with the extended tile as the origin node for HI is H which is located in the extended tile. Conversely the link LK is not associated with the tile A as the origin node for LK is located outside the extended tile. KJ, GH, HK, are associated with the tile for similar reasons.

In one scenario, a node may lie exactly on the boundary of two tiles. The conflict may be resolved by a rule that states that either the east/west and south/north edges are assigned to a tile and the other one is left for the neighboring tile.

At act A120, map matched geospatial data is acquired for the extended tile based on the link-tile association determined at act A110. For geospatial data that has not been map-matched, the tiles provide boundaries to determine which observational data and clusters will be assigned to the tiles. For map matched data, the geospatial data is the data that is map matched to the links associated with the tiles.

In an embodiment, different categories of observations (e.g. different signs types) may be split into different data sets with clustering performed separately on each type. For example, a stop sign and a street sign may both be included in an initial dataset. Each observational data point may indicate which of two signs that the data point is identifying.

The system may split the dataset into two separate datasets for clustering as the stop sign data and street sign data would not be clustered together.

Map matched data may be geospatial data that has been matched to a link identifier using a map matching algorithm. Any map matching algorithm may be used. The result of the map matching algorithm may be a link identifier of the matching link and a position or offset on the link, and a direction of travel. For example, a data point in the geospatial data may include coordinate data outside of a road. A simple map matching algorithm may identify the closest link and assign an offset by calculating a perpendicular line from the link to the data point. The distance from a designated node to where the perpendicular line crosses the link is the offset. The result of a map matching algorithm on a two-dimensional (x,y) cluster of data points is a one-dimensional cluster of map matched data points distributed along one or more links. Due to positioning or locational errors, certain data points that correspond to the same physical feature may be map matched to two different links.

The direction of travel may be, for example, either "forward" or "backward" as defined with respect to the start of the link. The direction of travel may be provided with the observational data or may be derived from attributes of the link or the observational data. The observation data may depend on the direction of travel. For example, certain features may only be observed from one or another direction. After map matching each observation data point, the data points are assigned a direction of travel on the link. The assignment may be done by both path based and point based map matchers when there is sufficient information.

The link identifier, offset, and direction may be used to assign the geospatial data to one or more tiles. The assignation is based on the link as described in act A110. A link may be associated with a tile if an origin of the link is in the tile. In an embodiment, the origin of the link is defined by an entry node of the link. For "forward" direction of travel the entry node corresponds to the start node of the link. For "backward" direction it is the end node. For example, for a link with nodes P and Q, if vehicles travel from P to Q then P is the entry node and Q is the exit node. If vehicles travel from Q to P, then Q is the entry node and P is the exit node.

Figure 8B:
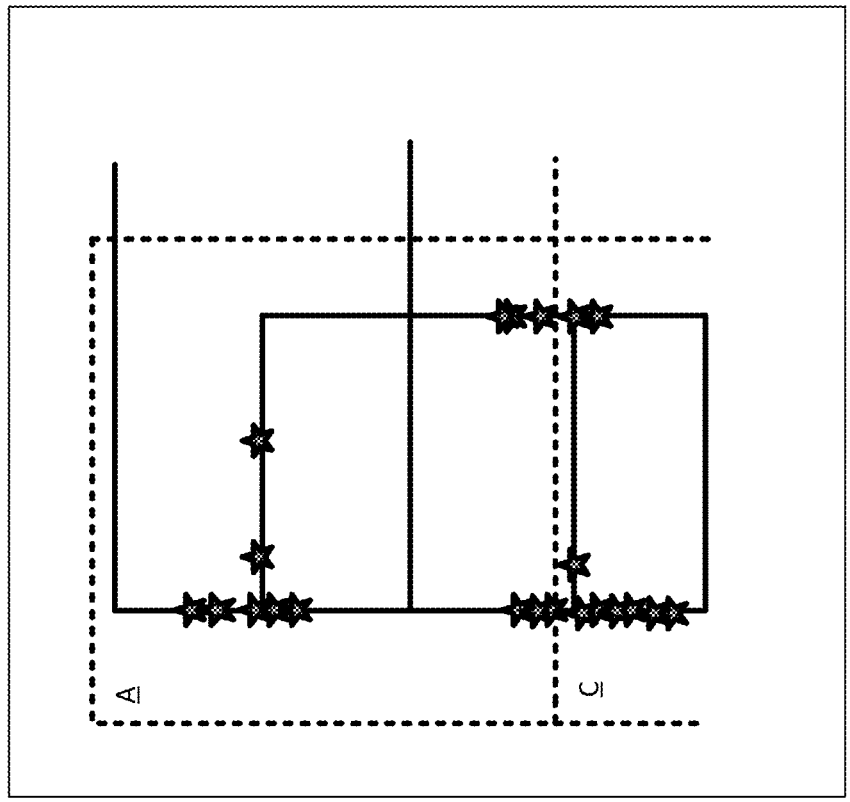
FIGS. 8A and 8B depict an example of two dimensional and one dimensional geospatial data.
Figure 8A:
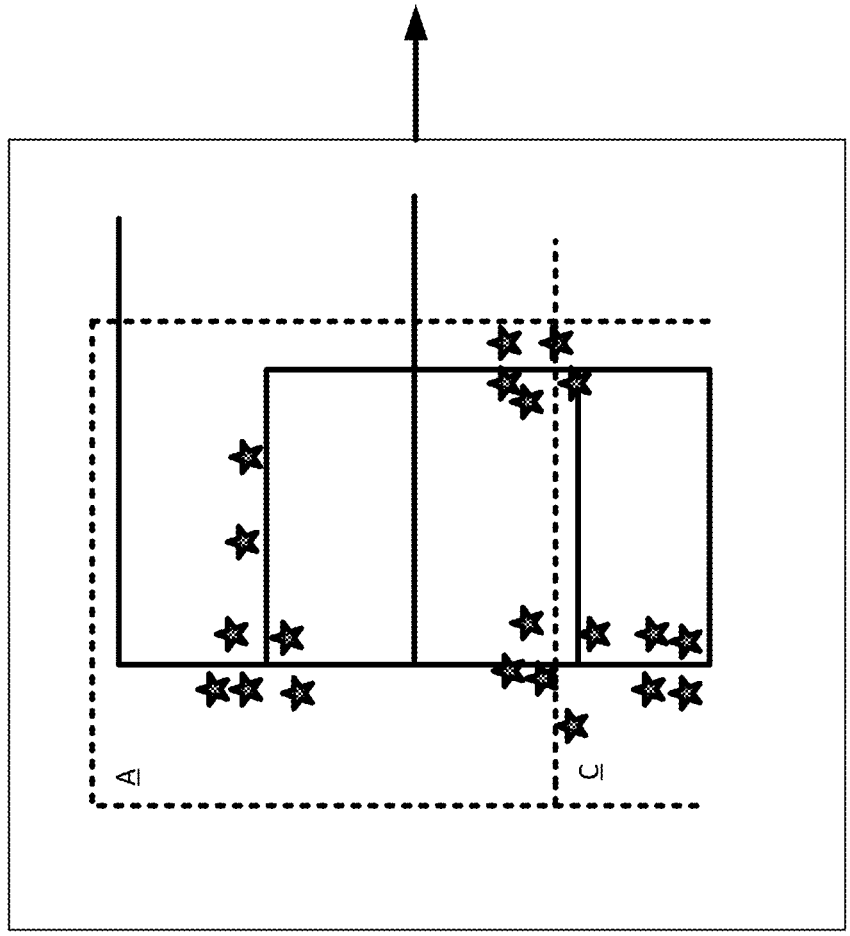

FIGS. 8A and 8B depicts map matched data. FIG. 8A depicts the roadway network of FIG. 2 with geospatial data points include (x,y) coordinates. FIG. 8B depicts the same roadway network with the data points map matched to the links. Each of the data points of 8A are now matched to a link. The location on the link is determined by the map matching algorithm and is depicted by the offset from a node of the link.

At act A130, a family of links is generated from the one or more links. The family of links is an ordered contiguous set of links. The family of links may extend beyond the border of the tile. The family of links may include one or more links based on link attributes. Link connectively may be used to identify a family of links. For each link, there may be an association with an entry and exit directional link. Each link may include a directional component. An entry link may be a link that connects to the link from which traffic enters in the correct direction. Likewise, an exit link may be a link traffic exits to. Each link may have one or more entry or exit links. The selection of a particular entry or exit link may be based on one or more attributes of the link(s). The selection may be based on the type of observational data. Possible selections based on the attributes of the links are the links that are the natural entry or continuation based on the change of direction at link boundaries, the most probable route taken by cars, etc. More than one entry (or exit) link may be used.

Once the entry and exit links have been identified, additional rules are applied to determine if a link is part of a family of links. If a link has a first observation data point within E of its end and the connected exit link has a second observation data point within E from the first observation, the exit link is added to the family of links. If the exit link also includes another connected link that satisfies the criteria, the link is also added. If a link has a length smaller than E, the continuation and preceding link are identified to determine if the links can be linked through observations separated by a distance smaller than E.

E may be defined based on an expected cluster size. E may represent a distance so that the two most distant points in a cluster are separated by distance less than E. E may be a distance that is a parameter of the DBSCAN algorithm for defining a dense region. The value of E may be tuned by a user and may be specific to a specific scenario. This distance E is used as a requirement to provide that all links boundaries that potentially may be covered by a cluster are explored. For DBSCAN there is a minimum number of points (also a tuning parameter) within E to grow a cluster. In the context of a clustering algorithm other than DBSCAN the distance E may also be related to a distance defining neighboring point connectivity.

FIGS. 9A and 9B depict generating a family of links. In FIGS. 9A and 9B, two links 610 and 620 are depicted with two data points 630 and 640. The distance E is also depicted. In FIG. 9A, the links belong to a family as the data point 630 is within E of the node and the connected link has a data point 640 within E of the data point 630. In FIG. 9B, the links do not belong to a family as data point 640 is outside the distance E from data point 630.

The family of links that are generated are sequences of directional links (e.g. an ordered series of connected links on which traffic travels in a similar direction) that potentially contain clusters that cross boundaries. The family of links are the units of data that are submitted for clustering below at acts A140 and A150. Using the criteria, a cluster cannot cross families. Accordingly, the returned results at A160 do not need to be further inspected to avoid duplications.

Based on the latitude and longitude some observations may be in a tile of origin of the link and others in a neighboring one. If a very long link crosses more than two tiles there could be observations belonging to yet another tile. However, for the purposes of data partitioning all the links will all be associated with the tile of origin of the link.

Figure 10:
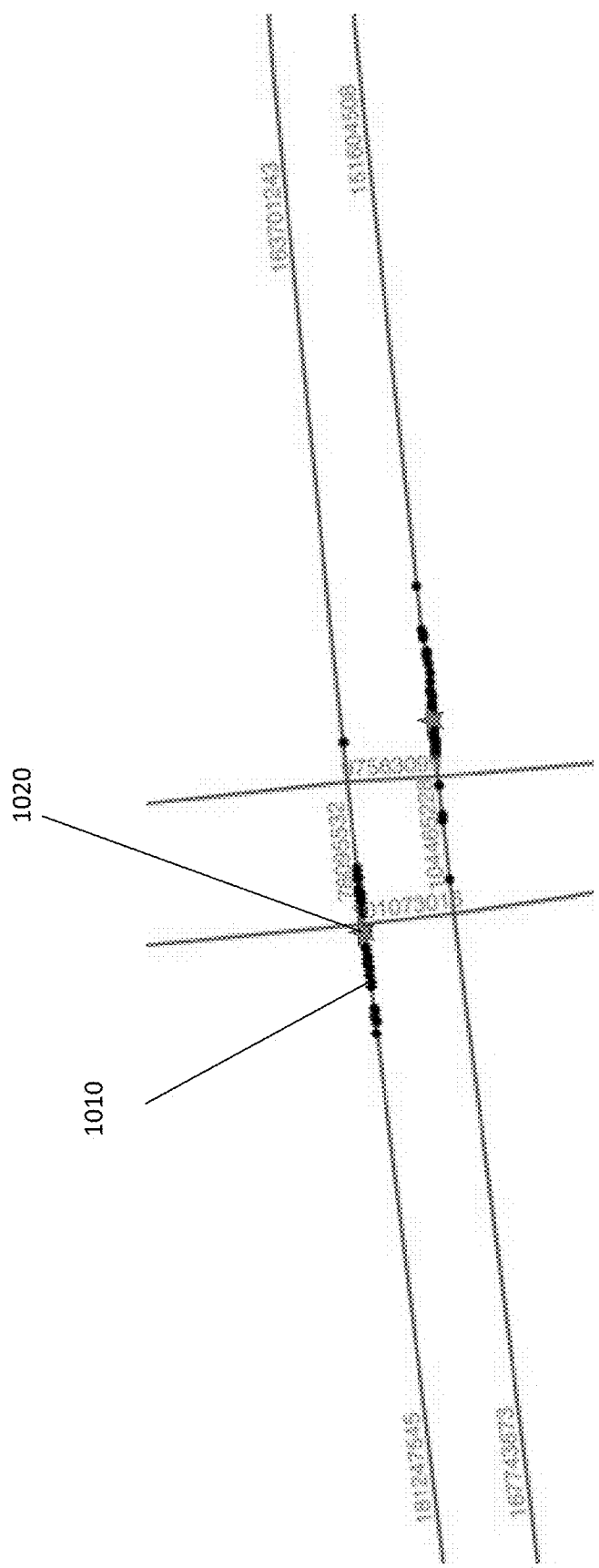
FIG. 10 depicts two examples of families of links.

FIG. 10 depicts two example where the observations of events each covering two links that form the families of links. FIG. 10 depicts observation points 1010 and the cluster centers 1020 (stars) for observation spread over more than one road link. The links are represented by the lines with their identifiers. In this example the observations of two families of links (18247545, 78095532) and (104465228, 15604508) for clustering. Link 163701243 was not included in the first family as the sole observation on this link did not pass the proximity requirements.

At act A140, a cluster of map matched geospatial data is identified that is at least partially associated with the family of links. A clustering algorithm is run on the geospatial data for the family of links. The clustering algorithm may identify one or more clusters of the map matched geospatial data. Any clustering algorithm may be used, for example k-means or DBSCAN. The clustering algorithm identifying the data points that are in the cluster as well as a center of the cluster.

The center may be a data point or may be, for example, an average location on the link generated as a function of the locations of the data points in the cluster. The center may be calculated using different algorithms.

Figure 11:
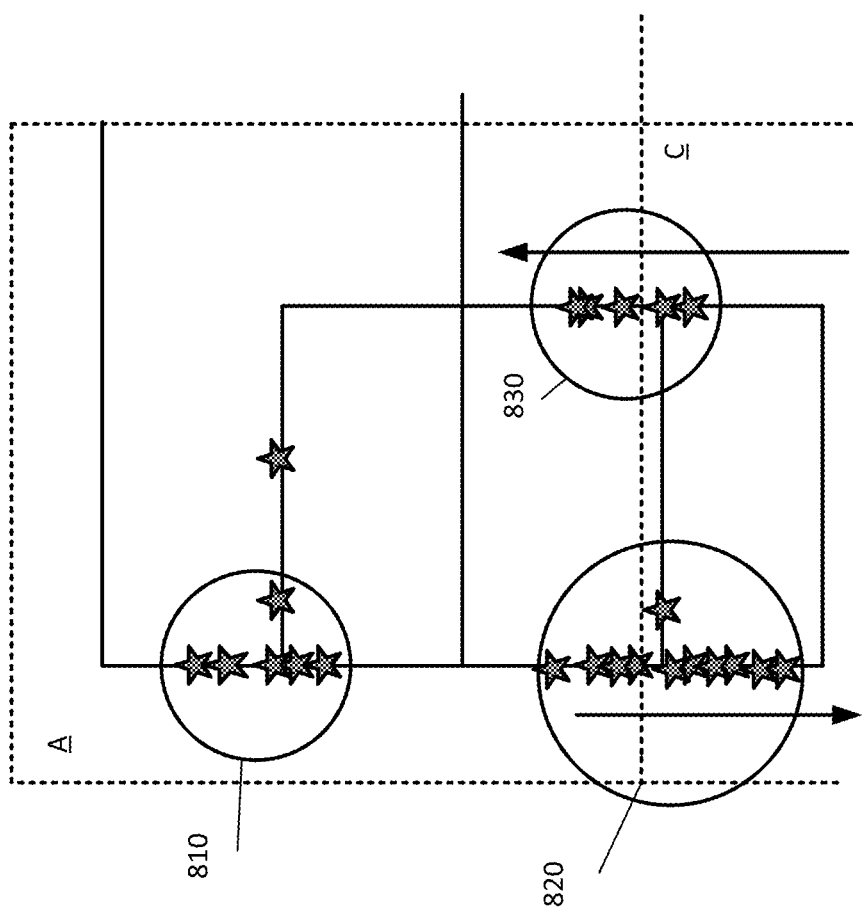
FIG. 11 depicts an example of clustered map matched geo spatial data.

FIG. 11 depicts clustered map matched data. FIG. 11 depicts three clusters, 810, 820, and 830. FIG. 11 further corresponds to the link and node attributes of FIG. 7. There are directional components for the links. The directional components may determine which clusters are accepted and which clusters are rejected.

At act A150, the cluster is determined to be centered on a link of the family of links that originate in the tile. The cluster may be centered on a directional link associated with the tile (origin inside the tile, taking into account direction). If a directional link crosses the tile boundary it is possible that the coordinates of the center are actually in this neighboring tile. However, the association is based on the center being on a link associated with the original tile.

As depicted in FIG. 11, cluster 820 is located on family of links that originate in the tile. The family of links is identified in act A130 as including links GH and HI from FIG. 7 as originating in the tile (due to the direction of travel) and satisfying the criteria of E. Cluster 830 does not have a center on a family of links as link LK does not have an origin node in the tile as a result of the direction of travel on LK.

At act A160, the cluster is accepted by the tile (e.g. processing unit). To ensure uniqueness, for each processing unit, only the clusters with centers are on the links originating from the tile are accepted. For FIG. 11 and tile A, the clusters of 810 and 820 would be accepted by the processing unit. The cluster 830 may be assigned by a different parallel process to, for example, tile C.

At act A170, the cluster is reported for aggregation with other clusters from other parallelized processes. When the cluster is not determined to be centered on a link of the family of links, the cluster is ignored for reporting purposes as the cluster is centered on a link belonging to a different tile, that processing unit will report the cluster. Each cluster is uniquely reported preventing duplicate clusters being reported.

The reported data from each of the processing units may be used to update the geographic database 123. The observational data may relate to one or more different roadway features, e.g. signage. The combined processed dataset may include locational data for one or more features. For example, the dataset may start as a collection of observational data points from multiple devices in a region. The dataset is split into different types of observations. The observation type specific datasets are partitioned and clustered using the parallel process of acts A110 to A170. The clusters are aggregated by the mapping system to generate a dataset that includes a single set of locational coordinates for each unique feature on the roadway that corresponds to the original dataset. The feature data may be transmitted to navigation devices in order to facilitate routing, navigation, or operation of a vehicle.

Datasets for parallel processing may be acquired at different times or at regular intervals. Each time a similar dataset is received, the parameters of the partitioning process may be altered to more efficiently partition the data. The parameters for distance (D), the tile size (and number), the parameters that define how the family of links is generated, and the clustering algorithm may be altered automatically or by a user.

Figure 12:
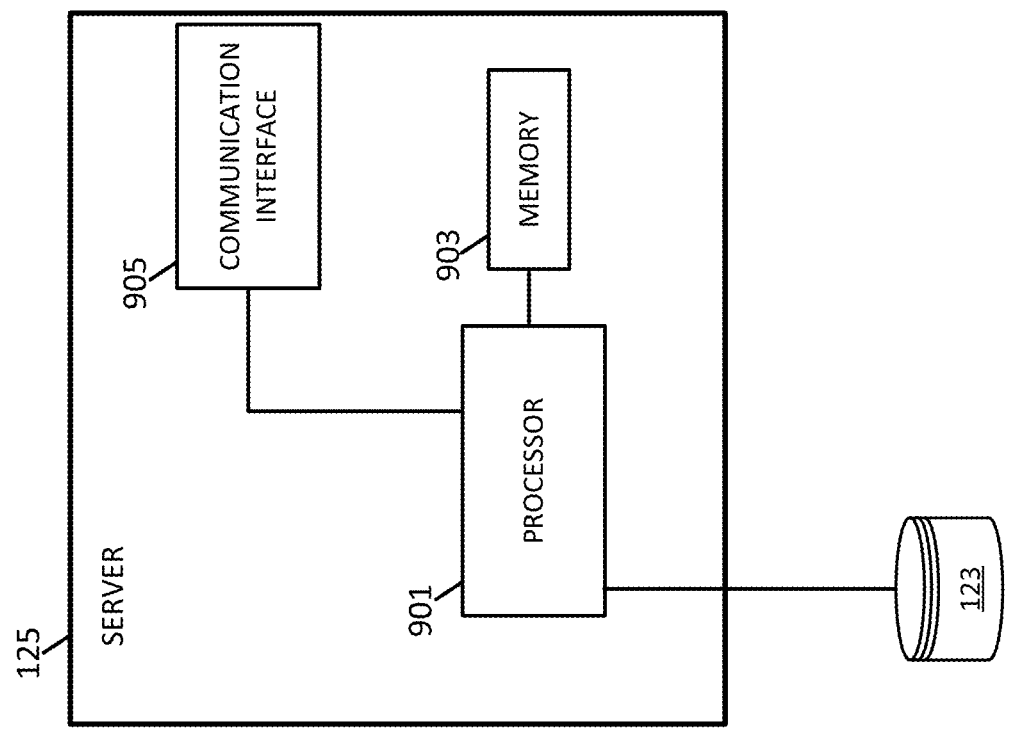
FIG. 12 depicts an example server of FIG. 3.

FIG. 12 illustrates an example server 125 of the system of FIG. 3. The server 125 includes a processor 901 that is connected to a communications interface 905 and a memory 903. The server 125 may represent individual processing units of a plurality of parallel processors. Alternatively, the server 125 may include multiple processors, each representing an individual processing unit of the plurality of parallel processors. The server 125 may be implemented as a distributed cloud computing service. Each processing unit/node (or processor) may be configured to process independently a partition of a dataset. The partitions or dataset may be universally available for each processor or each processor may only have access to one or more partitions. Each processor may be configured to perform a clustering algorithm, accept or reject clusters, and report accepted clusters back to the mapping system 121.

A processor(s) 901 is also connected to the geographic database 123. The communications interface 905 may configured to receive observational data a device. The memory 903 is configured to store observational data points, and attributes for the tiles and partitioning process. The processor 901 is configured to partition geospatial data. The processor 901 may be configured associate one or more links with a tile of a plurality of tiles. The processor 901 acquires map matched geospatial data for the tile based on the link tile association. The processor 901 generate a family of links from the one or more links. The processor identifies a cluster of map matched geospatial data at least partially associated with the family of links. The processor 901 determines that the cluster is centered on a link of the family of links originating in the tile. The processor 901 assigns the cluster to the tile. The processor 901 reports the cluster for aggregation with other clusters from other parallelized processes. Additional, different, or fewer components may be included.

The processor(s) 901 may include a general processor, digital signal processor, an application specific integrated circuit (ASIC), field programmable gate array (FPGA), analog circuit, digital circuit, combinations thereof, or other now known or later developed processor. The processor(s) 901 may be a single device or combinations of devices, such as associated with a network, distributed processing, parallel processing, or cloud computing, or combinations therein.

The communications interface 905 may include any operable connection. An operable connection may be one in which signals, physical communications, and/or logical communications may be sent and/or received. An operable connection may include a physical interface, an electrical interface, and/or a data interface. The communications interface 905 provides for wireless and/or wired communications in any now known or later developed format. The communications interface 905 may include a receiver/transmitter for digital radio signals or broadcast mediums.

The memory 903 may include one or more of a read only memory (ROM), random access memory (RAM), a flash memory, an electronic erasable program read only memory (EEPROM), or other type of memory. The memory is configured to store data for the repeating geometry pattern. The memory may store a list of features for each repeating geometry pattern.

Figure 13:
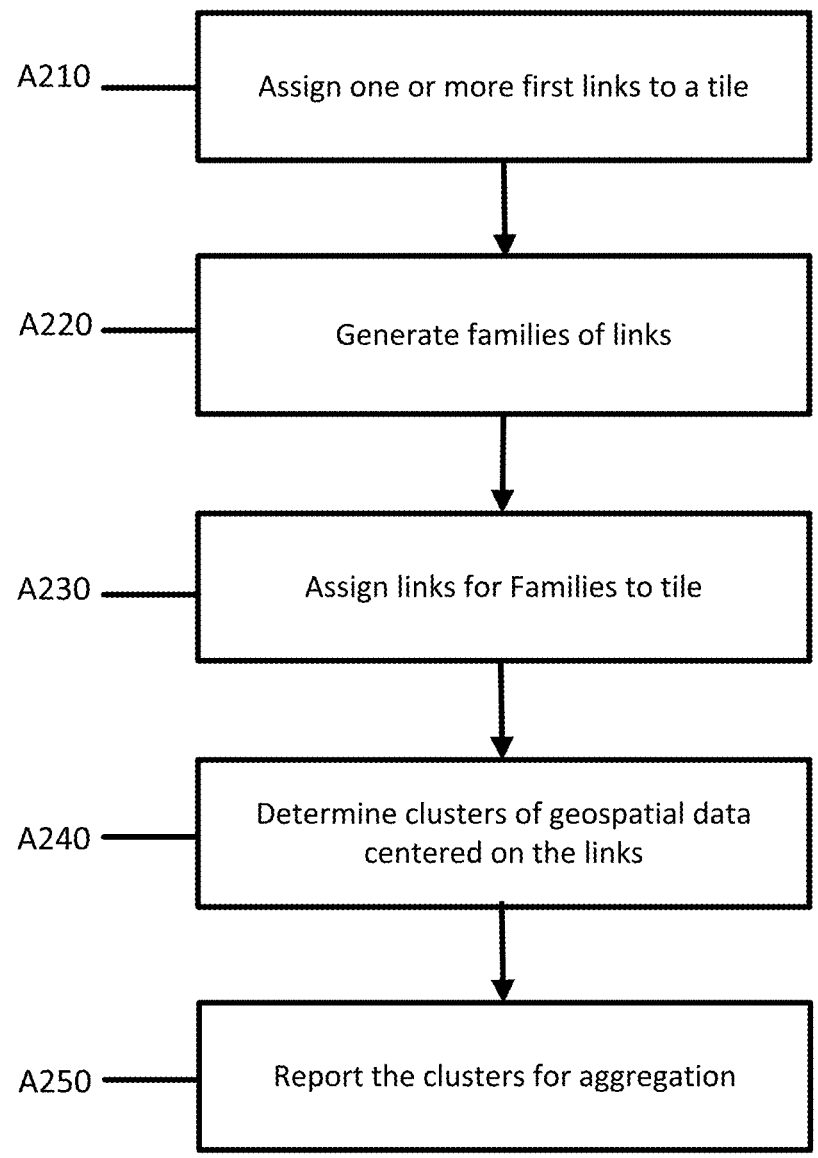
FIG. 13 depicts a workflow for partitioning geospatial data for parallelized clustering according to an embodiment.

FIG. 13 depicts an example method for parallel geospatial clustering using the server 125 of FIG. 12. As presented in the following sections, the acts may be performed using any combination of the components indicated in FIG. 3 or FIG. 12. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A210, the processor 901 assigns one or more first links to a tile. The one or more first links are entirely within the tile, e.g. both nodes of the link are located within the tile borders. By existing entirely with the tile, there are no potential conflicts with other tiles. The data points on the one or more first links may be expected to be clustered in the tile.

At act A220, the processor 901 generates one or more families of links comprising one or more second links, the family of links originating in the tile. A family of links may be defined by a connectively and direction of links that cross the border of a tile. The family of links may include links that originate within an extended tile. The extended tile includes a larger area than the tile. For example, the borders of the tile may be extended out by a distance D. Origination of links may be defined by one or more predetermined rules. For example, for directional links, an origin node may be the node from which traffic enters. In a scenario, a directional link from which traffic exits a tile may be determined to be in the tile if the node from which traffic enters the directional link is in the tile. Additional rules or criteria may be used or applied to identify or generate the family of links. For example, if a link has an observation within E of its end and a connected exit link has an observation within E from the observation, the exit link is added to the family. If this exit neighbor has its own extension, the extension is also added. If a link has a length smaller than E, the continuation and preceding link are used to identify if the link may be linked through observations separated by a distance smaller than E.

At act A230, the processor 901 assigns the one or more second links to the tile. The one or more second links (and related data points) will be processed by the processor 901. Links may be assigned to one or more processors in a parallel processing system. Links that cross from one tile to another may be assigned to one, two, or more tile, and as such one, two, or more processors for processing.

At act A240, the processor 901 clusters geospatial data relating to the one or more first links and one or more second links. Any clustering algorithm may be used. For example, DBSCAN may be used to cluster the data. DBSCAN defines a cluster as a maximal set of density-connected points. The output of a clustering algorithm may be a group of data points and a center of the cluster. The processor 901 determines which of the one or more geospatial data clusters are centered on the one or more first links or centered on a link of the one or more second links originating in the tile. The clusters that are centered on a link that originates in the tile will be accepted by the tile.

At act A250, the processor 901 reports using the communication interface 905, the one or more geospatial data clusters for aggregation with other data from other processors. The communications interface 905 may communicate with other servers 125 or other processors 901. The clusters that are not centered on a link that originates in the tile will be discarded. The discarded clusters will be accepted by neighboring tiles as the clusters originate on links in the neighboring tiles. In this way, duplication of results is avoided.

Figure 14:
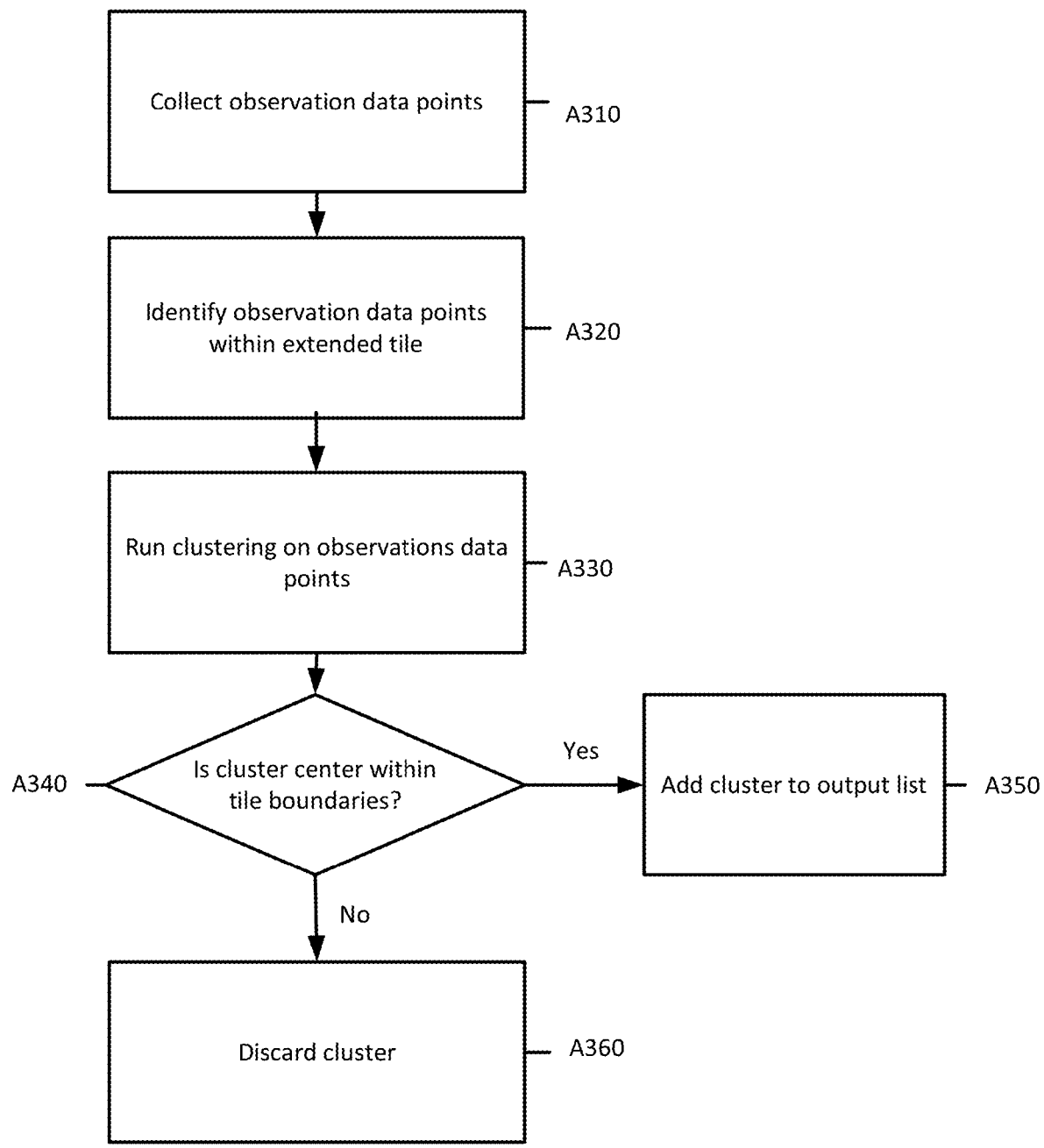
FIG. 14 depicts a workflow for partitioning geospatial data for parallelized clustering according to an embodiment.

FIG. 14 illustrates an example flow chart for parallel geospatial clustering. The parallelization approach for two-dimensional clustering includes partitioning of the data with a procedure to avoid cluster duplication. As presented in the following sections, the acts may be performed using any combination of the components indicated in FIG. 3, FIG. 12, or FIG. 16. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A310, observation data is acquired. Observation data may include a latitude and longitude component. The observation data may thus be mapped using a two-dimensional grid. The grid may include one or more tiles. Partitioning is based on tile association. Depending on the nature and volume of the data, different tile levels may be used. For example, high-volume data that includes relatively compact grouping of observations may be processed with level 14 tiles, while sparser data with larger scale clusters may be processed utilizing larger tiles. A configuration parameter may be used specify the tile level based on a user's knowledge of the dataset. The tile level may also set automatically using parameter or attributes of the dataset to be processed.

At act A320, observation data is identified for an extended tile. The scale of the cluster sizes may be identified based on the type of data in the dataset. A distance D is defined such that for all (or virtually all clusters) of the type the two most distant points are separated by distance less than D. The distance may be derived from domain knowledge or experimentation on subsets of the data. For efficient operation D should be a relatively small fraction of the tile size. The distance D is used to set tile extension margins for the data partitioning process. The data points are partitioned based on their association with a tile that includes extended D margins. A point is associated with a tile if the point is within the extended margins of this tile. Some points within distance D of the proper tile boundary belong to more than one "extended" tile.

At act A330, a clustering algorithm is run on the observation data for the extended tile. Any clustering algorithm may be used. In an embodiment, DBSCAN may be used to identify the clusters and a center of the clusters. The center of the cluster may be different depending on the algorithm used to cluster the data. Any center may be used. For example, the average, the median, one or more peaks, a most common value, a weighted average etc.

At act A340, whether or not the cluster center is within the tile boundaries (not the extended tile) is determined. At act A350, if the cluster is within the boundaries, to enforce uniqueness of the output clusters from the produced clusters only the output clusters with centers within the proper tile boundaries are accepted. At act 360, clusters that include a center outside the tile boundaries are rejected. The rejected clusters will be reconstructed and accepted when a neighboring partition is processed.

Figure 15:
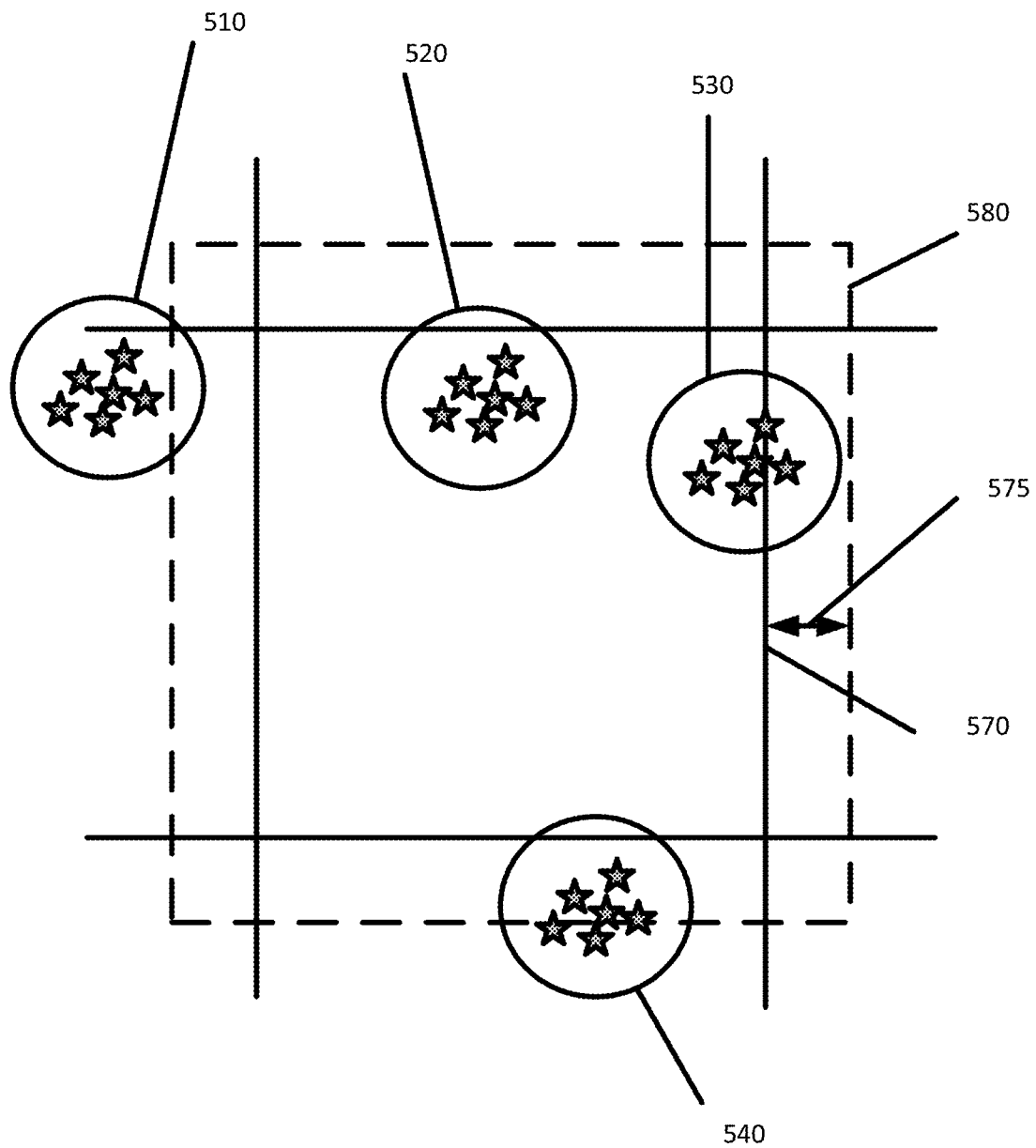
FIG. 15 depicts an example of two-dimensional geospatial data and an extended tile.

FIG. 15 depicts a tile with the margin extensions 580 and several scenarios (510, 520, 530, 540) for the location of clusters. The tile boundaries 570 are separated from the extended tile boundaries 580 by a distance 575. The data points in the cluster 510 are not included in the partition as each of the data points are outside the tile boundary. The data points for 520, 530, and 540 that are inside the extended boundary are added to the partition. The clustering algorithm is run on the data points. The data points for 540 that are not inside the extended tile are not input into the clustering algorithm as they are not part of the partition. This does not affect the final result as the cluster 540 is discarded regardless as the center is not in the original tile boundaries. The clusters 520 and 530 both include centers within the original tile boundaries and will be accepted.

Figure 16:
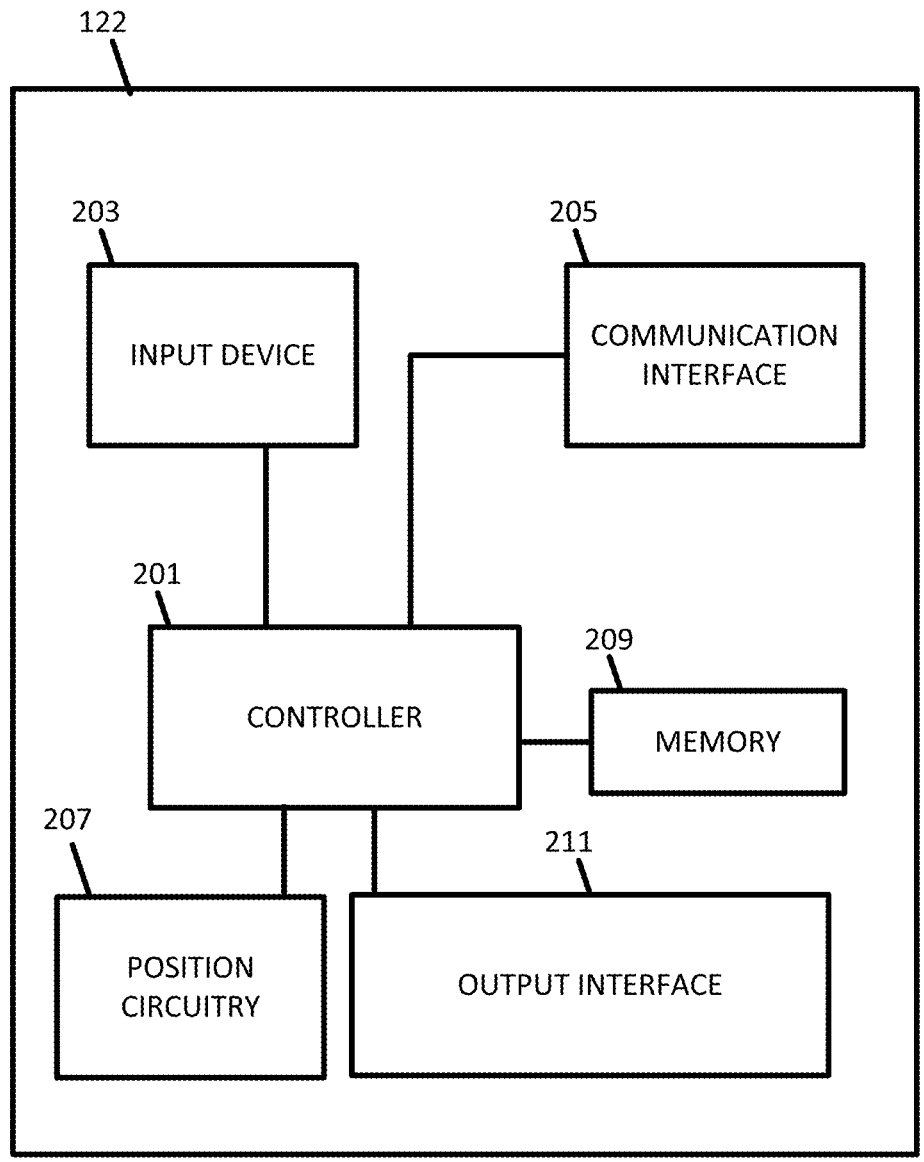
FIG. 16 depicts an example device of FIG. 3.

FIG. 16 illustrates an example device 122 of the system of FIG. 3. The device 122 may be configured to collect, transmit, receive, process, or display data. The device 122 may also be referred to as a probe 122, a mobile device 122 or a navigation device 122. The device 122 includes a controller 201, a memory 209, an input device 203, a communication interface 205, position circuitry 207, and an output interface 211. Additional, different, or fewer components are possible for the mobile device 122. The device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle.

A device 122 may traverse a roadway network. The current location of the device (and as such, vehicle) may be identified using positional circuitry 207 such as GPS or other positional inputs. The positioning circuitry 207, which is an example of a positioning system, is configured to determine a geographic position of the device 122. The positioning circuitry 207 may include movement circuitry, which is an example a movement tracking system, is configured to determine movement of a device 122. The position circuitry 207 and the movement circuitry may be separate systems, or segments of the same positioning or movement circuitry system. In an embodiment, components as described herein with respect to the navigation device 122 may be implemented as a static device. For example, such a device may not include positional circuitry 207, but may involve a speed or velocity detecting input device. The device 122 may identify its position as the device travels along a route using the positional circuitry. For indoor spaces without GPS signals, the navigation device 122 may rely on other geo-location methods such as LIDAR, radar, Wi-Fi, beacons, landmark identification, inertial navigation (dead reckoning), among others.

The device 122 may be configured to identify or observe features on the roadway and store the observations and location data related to therein. The observational data may be transmitted to a server or mapping system 121.

The device 122 may be configured to execute routing algorithms using a geographic database 123 to determine a route to travel along a road network from a starting location to a destination location in a geographic region. Using input from an end user, the device 122 examines potential routes between the origin location and the destination location to determine the optimum route in light of user preferences. The device 122 may identify a repeating geometry pattern in a route. The device 122 may then provide the end user with information about the route in the form of guidance that identifies the maneuvers required to be taken by the end user to travel from the origin to the destination location. The device 122 may use the identification of the repeating geometry patterns in the route to predict the location of features. Some devices 122 show detailed maps on displays outlining the route, the types of maneuvers to be taken at various locations along the route, locations of certain types of features, and so on. The device may receive data from the geographic database 123 through the communications interface 205.

The communications interface 205 may include any operable connection. An operable connection may be one in which signals, physical communications, and/or logical communications may be sent and/or received. An operable connection may include a physical interface, an electrical interface, and/or a data interface. The communication interface 205 provides for wireless and/or wired communications in any now known or later developed format. The communication interface 205 may include a receiver/transmitter for digital radio signals or other broadcast mediums.

The memory 209 may be a volatile memory or a non-volatile memory. The memory 209 may include one or more of a read only memory (ROM), random access memory (RAM), a flash memory, an electronic erasable program read only memory (EEPROM), or other type of memory. The memory 209 may be removable from the mobile device 122, such as a secure digital (SD) memory card. The memory may contain a locally stored geographic database 123 or link node routing graph. The locally stored geographic database 123 may be a copy of the geographic database 123 or may include a smaller piece. The locally stored geographic database 123 may use the same formatting and scheme as the geographic database 123.

The output interface 211 may be a liquid crystal display (LCD) panel, light emitting diode (LED) screen, thin film transistor screen, or another type of display. The output interface 211 may also include audio capabilities, or speakers.

The device 122 may be integrated into an autonomous vehicle or a highly-assisted or highly-automated driving (HAD) vehicle. The device 122 may be configured as a navigation system for an autonomous vehicle or a HAD. An autonomous vehicle or HAD may take route instruction based on the link and node information provided to the navigation device 122. An autonomous vehicle or HAD may be configured to observe and report features to a mapping system 121. An autonomous vehicle or HAD may be configured to receive mapping data from a mapping system 121 or geographic database 123.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125, which may have been updated.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following embodiments are disclosed. Embodiment 1: a method for parallel geospatial clustering, the method comprising: determining a link tile association between one or more links and a tile of a plurality of tiles; acquiring map matched geospatial data for the tile based on the link tile association; generating a family of links from the one or more links; identifying a cluster of the map matched geospatial data that is at least partially associated with the family of links; determining that the cluster is centered on a link of the family of links that originates in the tile; assigning the cluster to the tile; and reporting the cluster for aggregation with other clusters from other parallelized processes.

Embodiment 2: the method of embodiment 1, wherein the family of links comprises a sequence of connected links that share a directional component.

Embodiment 3: the method of embodiment 2, wherein the sequence of connected links includes at least one link with an origin node in the tile.

Embodiment 4: the method of embodiment 1, wherein determining that the cluster is centered on a link of the family of links that originates in the tile comprising: determining that the center of the cluster is on the link; determining that a node of the link is located in the tile; and determining that the node is an entry node for the link.

Embodiment 5: the method of embodiment 1, further comprising selecting a size of the plurality of tiles based on a type of geospatial data.

Embodiment 6: the method of embodiment 1, wherein associating one or more links with the tile comprises: selecting a distance to extend the tile; and identifying the one or more links with at least one node inside the extended tile.

Embodiment 7: the method of embodiment 6, wherein the distance is selected as a function of an expected cluster size for the geo spatial data.

Embodiment 8: the method of embodiment 1, wherein the cluster of map matched geospatial data is identified using density-based spatial clustering of applications with noise.

Embodiment 9: the method of embodiment 1, wherein generating a family of links comprises: identifying an exit link for a target link of the one or more links; adding the target link to the family of links if the target link includes a first geospatial data point of the geospatial data within a distance of a shared node with an exit link and the exit link includes a second geo spatial data point within the distance from the first geo spatial data point.

Embodiment 10: a method for parallel geospatial clustering, the method comprising: assigning one or more first links to a tile, wherein the one or more first links are entirely within the tile; generating one or more families of links comprising one or more second links, the families of links originating in the tile; assigning the one or more second links to the tile; determining one or more geo spatial data clusters of map matched geospatial data centered on the one or more first links or centered on the one or more second links; and reporting the geospatial data clusters for aggregation with other parallel processed geospatial data.

Embodiment 11: the method of embodiment 10, wherein the family of links comprises: a sequence of connected links that share a directional component.

Embodiment 12: a system for parallel geospatial clustering, the system comprising: a geographic database configured to store one or more features and locational data; a mapping system configured to determine a link tile association between one or more links and a tile of a plurality of tiles; acquire map matched geospatial data; generate a family of links from the one or more links; and update the geographic database with cluster data from a plurality of parallel processors; and a parallel processor of the plurality of parallel processors, the parallel processor configured to identify a cluster of the map matched geospatial data at least partially associated with the family of links; determine that the cluster is centered on a link of the family of links originating in the tile; and report cluster data for the cluster to the mapping system.

Embodiment 13: the system of embodiment 12, wherein the family of links comprises a sequence of connected links that share a directional component.

Embodiment 14: the system of embodiment 12, wherein the mapping system is further configured to select a size of the tile based on a type of geospatial data.

Embodiment 15: the system of embodiment 12, wherein the map matched geospatial data relates to a single type of roadway feature.

Embodiment 16: the system of embodiment 12, wherein the map matched geospatial data is acquired from a navigation device traversing a roadway network.

Embodiment 17: the system of embodiment 12, wherein the mapping system is configured to determine the link tile association by selecting a distance to extend the tile and identifying the one or more links with at least one node inside the extended tile.

Embodiment 18: the system of embodiment 17, wherein the distance is selected as a function of an expected cluster size for the map matched geospatial data.

Embodiment 19: the system of embodiment 12, where the mapping system generates the family of links by identifying an exit link for a target link of the one or more links and adding the target link to the family of links if the target link includes a first geospatial data point of the map matched geospatial data within a distance of a shared node with an exit link and the exit link includes a second geospatial data point within the distance from the first geo spatial data point.

Embodiment 20: the system of embodiment 12, wherein a number of the plurality of tiles matches a number of the plurality of processors.

I claim:

1. A method for preventing duplicate reporting for parallel geospatial clustering by a plurality of parallel processing units, the method comprising:
    determining a link tile association between one or more links and a tile of a plurality of tiles, wherein each tile of the plurality of tiles is processed in parallel by a different parallel processing unit of the plurality of parallel processing units;
    acquiring, by a parallel processing unit for the tile, map matched geospatial data for the tile based on the link tile association;
    generating, by the parallel processing unit, a family of links from the one or more links, wherein the family of links comprises a sequence of connected links that share a directional component;
    identifying, by the parallel processing unit, a first cluster of the map matched geospatial data that is at least partially associated with the family of links and a second cluster of the map matched geospatial data that is at least partially associated with the family of links;
    determining, by the parallel processing unit, that the first cluster is centered on a link of the family of links that originates in the tile;
    determining, by the parallel processing unit, that the second cluster is not centered on a link of the family of links that originates in the tile;
    reporting, by the parallel processing unit, based on the determination that the first cluster is centered on a link of the family of links that originates in the tile, the first cluster for aggregation with other clusters from other parallel processing units operating in parallel;
    not reporting, by the parallel processing unit, based on the determination that the second cluster is not centered on a link of the family of links that originates in the tile, the second cluster for aggregation to prevent duplicative reporting of the second cluster by the plurality of parallel processing units; and
    updating a geographic database with the reported cluster.

2. The method of claim 1, wherein the sequence of connected links includes at least one link with an origin node in the tile.

3. The method of claim 1, wherein determining that the first cluster is centered on a link of the family of links that originates in the tile comprising:
    determining that a center of the first cluster is on the link;
    determining that a node of the link is located in the tile; and
    determining that the node is an entry node for the link.

4. The method of claim 1, further comprising:
    selecting a size of the plurality of tiles based on a type of geospatial data.

5. The method of claim 1, wherein associating one or more links with the tile comprises:
    selecting a distance to extend the tile; and
    identifying the one or more links with at least one node inside the extended tile.

6. The method of claim 5, wherein the distance is selected as a function of an expected cluster size for the geospatial data.

7. The method of claim 1, wherein the first cluster of map matched geospatial data is identified using density-based spatial clustering of applications with noise.

8. The method of claim 1, wherein generating a family of links comprises:
  identifying an exit link for a target link of the one or more links;
  adding the target link to the family of links if the target link includes a first geospatial data point of the geospatial data within a distance of a shared node with an exit link and the exit link includes a second geospatial data point within the distance from the first geospatial data point.

9. A method for parallel geospatial clustering, the method comprising:
  assigning, by a parallel processing unit of a plurality of parallel processing units, one or more first links to a tile, wherein the one or more first links are entirely within the tile;
  generating, by the parallel processing unit, one or more families of links comprising one or more second links, the one or more families of links originating in the tile and comprising a sequence of connected links that share a directional component;
  assigning, by the parallel processing unit, the one or more second links to the tile;
  determining, by the parallel processing unit, that one or more geospatial data clusters of map matched geospatial data are centered on the one or more first links or centered on the one or more second links;
  determining, by the parallel processing unit, that one or more geospatial data clusters of map matched geospatial data are not centered on the one or more first links or not centered on the one or more second links;
  reporting, by the parallel processing unit, a first geospatial data cluster of the one or more geospatial data clusters for aggregation with other parallel processed geospatial data based on a determination that the first geospatial data cluster is centered on the one or more first links or centered on the one or more second links;
  not reporting, by the parallel processing unit, a second geospatial data cluster of the one or more geospatial data clusters for aggregation with other parallel processed geospatial data based on a determination that the second geospatial data cluster is not centered on the one or more first links or centered on the one or more second links in order to prevent duplicative reporting by the plurality of parallel processing units; and
  updating a geographic database with the reported geospatial data cluster.

10. A system for parallel geospatial clustering, the system comprising:
  a geographic database configured to store one or more features and locational data;
  a mapping system configured to determine a link tile association between one or more links and a tile of a plurality of tiles; acquire map matched geospatial data; generate a family of links from the one or more links, the family of links comprising a sequence of connected links that share a directional component; and update the geographic database with cluster data from a plurality of parallel hardware processors; and
  the plurality of parallel hardware processors, each of the parallel hardware processors of the plurality of parallel hardware processors configured to: identify a first cluster of the map matched geospatial data at least partially associated with the family of links and a second cluster of the map matched geospatial data at least partially associated with the family of links; determine that the first cluster is centered on a link of the family of links originating in the tile; report cluster data for the first cluster to the mapping system based on the determination that the first cluster is centered on a link of the family of links originating in the tile; determine that the second cluster is not centered on a link of the family of links originating in the tile; and not report cluster data for the second cluster to the mapping system based on the determination that when second cluster is not centered on a link of the family of links originating in the tile in order to prevent duplicative reporting by two or more of the parallel hardware processors of the plurality of parallel hardware processors.

11. The system of claim 10, wherein the mapping system is further configured to select a size of the tile based on a type of geospatial data.

12. The system of claim 10, wherein the map matched geospatial data relates to a single type of roadway feature.

13. The system of claim 10, wherein the map matched geospatial data is acquired from a navigation device traversing a roadway network.

14. The system of claim 10, wherein the mapping system is configured to determine the link tile association by selecting a distance to extend the tile and identifying the one or more links with at least one node inside the extended tile.

15. The system of claim 14, wherein the distance is selected as a function of an expected cluster size for the map matched geospatial data.

16. The system of claim 10, where the mapping system generates the family of links by identifying an exit link for a target link of the one or more links and adding the target link to the family of links if the target link includes a first geospatial data point of the map matched geospatial data within a distance of a shared node with an exit link and the exit link includes a second geospatial data point within the distance from the first geospatial data point.

17. The system of claim 10, wherein a number of the plurality of tiles matches a number of the plurality of parallel hardware processors.

* * * * *

UNITED STATES PATENT AND TRADEMARK OFFICE
CERTIFICATE OF CORRECTION

PATENT NO. : 10,803,096 B2
APPLICATION NO. : 15/718951
DATED : October 13, 2020
INVENTOR(S) : Anton Anastassov It is certified that error appears in the above-identified patent and that said Letters Patent is hereby corrected as shown below:

In the Claims

Claim 10, Column 26, starting at Line 22. Delete "determination that when" and replace with --determination that the--.

Signed and Sealed this
Twenty-second Day of December, 2020

Andrei Iancu
*Director of the United States Patent and Trademark Office*